United States Patent
Liu et al.

(10) Patent No.: US 11,724,879 B2
(45) Date of Patent: Aug. 15, 2023

(54) MANAGEMENT METHOD, DEVICE AND SYSTEM APPLIED TO GOODS-TO-PERSON SYSTEM, SERVER AND COMPUTER STORAGE MEDIUM

(71) Applicant: BEIJING GEEKPLUS TECHNOLOGY CO., LTD., Beijing (CN)

(72) Inventors: Kai Liu, Beijing (CN); Haoyu Wang, Beijing (CN); Xun Wu, Beijing (CN); Kai Sun, Beijing (CN)

(73) Assignee: BEIJING GEEKPLUS TECHNOLOGY CO., LTD., Beijing (CN)

(*) Notice: Subject to any disclaimer, the term of this patent is extended or adjusted under 35 U.S.C. 154(b) by 297 days.

(21) Appl. No.: 15/734,213

(22) PCT Filed: May 30, 2019

(86) PCT No.: PCT/CN2019/089351
§ 371 (c)(1),
(2) Date: Dec. 1, 2020

(87) PCT Pub. No.: WO2019/228474
PCT Pub. Date: Dec. 5, 2019

(65) Prior Publication Data
US 2021/0221613 A1     Jul. 22, 2021

(30) Foreign Application Priority Data

Jun. 1, 2018    (CN) .......................... 201810557067.3
Jun. 6, 2018    (CN) .......................... 201810579176.5
Jul. 19, 2018   (CN) .......................... 201810796192.X

(51) Int. Cl.
*G06F 7/00*         (2006.01)
*B65G 1/137*        (2006.01)
(Continued)

(52) U.S. Cl.
CPC .............. *B65G 1/1375* (2013.01); *B60S 9/14* (2013.01); *G05D 1/0217* (2013.01);
(Continued)

(58) Field of Classification Search
CPC ....... B65G 1/1375; B60S 9/14; G05D 1/0217; G06F 16/245; G06F 16/29;
(Continued)

(56) References Cited

U.S. PATENT DOCUMENTS 9,008,827 B1 *   4/2015   Dwarakanath .......... F25B 27/00
                                                       700/214
2011/0203231 A1   8/2011   Hortig et al.
(Continued)

FOREIGN PATENT DOCUMENTS

CN    102989683 A    3/2013
CN    103596858 A    2/2014
(Continued)

*Primary Examiner* — Yolanda R Cumbess
(74) *Attorney, Agent, or Firm* — Bayramoglu Law Offices LLC

(57) ABSTRACT

A management method applied to the goods-to-person system includes: in response to a task of putting products on shelves, calculating popularity of a product to be put on shelf according to historical sales order data of the product to be put on shelf, and matching the popularity of the product to be put on shelf with popularity of a shelf to determine a shelf area; selecting a goods location with space randomly in the determined shelf area, Wherein the goods location is used for storing the product to be put on shelf; and controlling a mobile robot to transport a shelf where the goods location is located to a work station.

30 Claims, 14 Drawing Sheets

(51) Int. Cl.
| | |
|---|---|
| *G06F 16/245* | (2019.01) |
| *G06F 16/29* | (2019.01) |
| *B60S 9/14* | (2006.01) |
| *G05D 1/02* | (2020.01) |
| *G06Q 10/0631* | (2023.01) |
| *G06Q 10/0637* | (2023.01) |
| *G06Q 30/0201* | (2023.01) |
| *G06Q 50/28* | (2012.01) |

(52) U.S. Cl.
CPC ............ *G06F 16/245* (2019.01); *G06F 16/29* (2019.01); *G06Q 10/06313* (2013.01); *G06Q 10/06315* (2013.01); *G06Q 10/06375* (2013.01); *G06Q 30/0201* (2013.01); *G06Q 50/28* (2013.01)

(58) Field of Classification Search
CPC ....... G06Q 10/06313; G06Q 10/06315; G06Q 10/06375; G06Q 30/0201; G06Q 50/28; G06Q 10/047; G06Q 10/06316; G06Q 10/0637; G06Q 10/087; G06Q 10/043; G06Q 10/0633; G06Q 10/06393; B25J 5/007; B25J 11/00
USPC .......................................... 700/213–216, 218
See application file for complete search history.

(56) References Cited

U.S. PATENT DOCUMENTS

| | | | |
|---|---|---|---|
| 2015/0032498 | A1 | 1/2015 | Qian et al. |
| 2015/0073587 | A1 | 3/2015 | Vliet et al. |
| 2016/0101940 | A1 | 4/2016 | Grinnell et al. |
| 2017/0038770 | A1* | 2/2017 | Wurman ............... C07C 255/43 |
| 2017/0203920 | A1 | 7/2017 | Otto et al. |
| 2018/0075402 | A1 | 3/2018 | Stadie et al. |
| 2018/0189725 | A1* | 7/2018 | Mattingly ............ G06Q 10/087 |
| 2019/0266552 | A1* | 8/2019 | Gupta ................ G06Q 30/0201 |

FOREIGN PATENT DOCUMENTS

| | | |
|---|---|---|
| CN | 104239065 A | 12/2014 |
| CN | 106022679 A | 10/2016 |
| CN | 106311615 A | 1/2017 |
| CN | 106516538 A | 3/2017 |
| CN | 106897852 A | 6/2017 |
| CN | 106956883 A | 7/2017 |
| CN | 106960301 A | 7/2017 |
| CN | 106980955 A | 7/2017 |
| CN | 107103445 A | 8/2017 |
| CN | 107103446 A | 8/2017 |
| CN | 107194646 A | 9/2017 |
| CN | 107444825 A | 12/2017 |
| CN | 107516201 A | 12/2017 |
| CN | 108107862 A | 6/2018 |
| CN | 108502435 A | 9/2018 |
| CN | 108792387 A | 11/2018 |
| CN | 108921327 A | 11/2018 |
| CN | 109086921 A | 12/2018 |
| CN | 109903112 A | 6/2019 |
| CN | 109086921 B | 2/2020 |
| DE | 102016110820 A1 | 12/2017 |
| EP | 3182348 A1 | 6/2017 |
| WO | 2014075620 A1 | 5/2014 |
| WO | 2017090108 A1 | 6/2017 |
| WO | 2017172782 A1 | 10/2017 |
| WO | 2017186825 A1 | 11/2017 |
| WO | 2017201490 A1 | 11/2017 |

* cited by examiner

MANAGEMENT METHOD, DEVICE AND SYSTEM APPLIED TO GOODS-TO-PERSON SYSTEM, SERVER AND COMPUTER STORAGE MEDIUM

CROSS REFERENCES TO THE RELATED APPLICATIONS

The present application is the national phase of International Application No. PCT/CN2019/089351, which claims the priority from Chinese Patent Application No. 201810579176.5 filed with the China National Intellectual Property Administration on Jun. 6, 2018, and the present application claims the priority from Chinese Patent Application No. 201810557067.3 filed with the China National Intellectual Property Administration on Jun. 1, 2018, and the present application claims the priority from Chinese Patent Application No. 201810796192.X filed with the China National Intellectual Property Administration on Jul. 19, 2018, which are hereby incorporated by reference in their entirety.

TECHNICAL FIELD

The present application relates to the field of logistics automation, for example, to a management method, apparatus and system applied to a goods-to-person system, a server and a computer storage medium.

BACKGROUND

At present, the logistics automation technology is booming, and the robot-based goods-to-person system has been widely used in the warehousing industry in western developed countries due to its flexibility and low-cost advantages. In traditional warehouse operations, the shelves are fixed, and operators need to walk to the designated goods locations for work. The robot-based goods-to-person system is different from the traditional operation mode. The shelves are transported to the platform by mobile robots and then queued. The operators operate on the platform without walking. The robot-based goods-to-person system improves the operation efficiency of the operators.

The related goods-to-person system also has many problems, such as unreasonable transportation routes and inventory layout, resulting in the low efficiency.

The rapid development of e-commerce has not only brought unprecedented development opportunities to the warehousing industry, but also posed severe challenges to warehousing services. For example, in Double-11 festival of e-commerce, there are shipments of tens of thousands or even hundreds of thousands of pieces per day in the warehouses. How to complete the picking tasks efficiently, accurately and low-costly is an important problem in the warehousing industry.

Usually, in the traditional "person-to-goods" picking mode, the inventory of items is relatively concentrated, the same items are all stored in adjacent goods trays of fixed shelves, and the picking paths of the pickers are basically fixed. By optimizing and combining the goods trays where the items are located, the effect of changing the picking paths to improve the picking efficiency is very small. In the related "goods-to-person" model, traditional automated sorting equipments such as shuttle trolleys are used to transport the goods trays in the large stereoscopic storehouse, which improves the picking efficiency compared with manual picking. However, a shuttle trolley can only transport one goods tray at a time, and each goods location usually only stores a kind of items. The shuttle trolley can only select the goods locations closest to the work station one by one according to the items required on the order, so this still cannot reduce the number of transports to further improve the picking efficiency by optimizing and combining the goods trays where the items are located. Every time the shuttle trolley transports the goods location to the work station, the picker picks a kind of items accordingly, and the picking efficiency is very limited.

In recent years, the vigorous development of robotics technology has brought huge technological changes to the entire logistics industry. The "goods-to-person" robot system has brought new technologies and new design concepts to the warehousing industry. In the "goods-to-person" robot system, the items can be stored dispersedly in the corresponding warehouse. For example, the same items are distributed on multiple shelves, and the robots use shelf as the transport unit. Compared with the shuttle trolley, the number of item transports is decreased, and the picking efficiency is further improved.

However, in the "goods-to-person" robot system, when the order tasks are issued in batches, faced with a lot of alternative shelves, how to combine shelves efficiently and pick out all the items in the order quickly is still an urgent problem.

With the continuous development of the economy, the labor cost spent in the logistics process is getting higher and higher. However, since enterprises and consumers are becoming more and more strict with the timeliness of items, more and more workers are needed under the premise of ensuring the timeliness of items, which will add the more labor cost. In order to reduce the labor cost and improve the logistics efficiency to ensure the timeliness of items, the warehouses that use robots to replace workers for storage have gradually become the development trend of warehouse storage.

At present, in the robot warehouse, a goods-to-person picking method is used for storage, that is, a robot transports a shelf to the work station, and a worker picks out the required items from the shelf at the work station and then packages and sends the picked-out items.

In the process of realizing the present application, the inventor found at least the following problems in related technologies.

In the related goods picking process, if the current shelf is far away from the work station and the current shelf is used frequently, then the current shelf needs to be transported back and forth for a long distance in the process during which the robot transports the current shelf to the work station, which will undoubtedly increase the transport time of the current shelf and reduce the transport efficiency of the current shelf Therefore, it is necessary to overcome this problem as possible in a certain way to reduce the transport time for the robot to transport the shelf and improve the picking efficiency, but there is no effective solution in the related technology.

SUMMARY

The present application proposes a management method, apparatus and system applied to a goods-to-person system, a server and a computer storage medium, so as to achieve the advantages of improving the picking efficiency of the goods-to-person system.

An aspect of the technical solution of the present application provides a shelf transport method applied to a goods-to-person system, including:

generating a transport task based on a shelf to be transported;

allocating a transport instrument with the shortest running track for the transport task;

performing the optimal path planning for the shelf in the transport task based on the waiting time;

for an order that is newly added to batch, selecting the shelf in the current transport task preferentially, and then generating a new transport task if the shelf in the current transport task cannot satisfy the order.

In an embodiment, the transport instrument is a mobile robot.

In an embodiment, the generating a transport task based on a shelf to be transported includes: generating a transport task for each shelf selected by the order, wherein each transport task is performed by an independent transport instrument.

In an embodiment, allocating a transport instrument with the shortest running track for the transport task includes: determining a first calculation distance from a nearest idle transport instrument to the shelf to be transported; determining a second calculation distance from a transport instrument that is currently used to transport a shelf to be returned to the shelf to be transported; and selecting a transport instrument with the closest distance based on the first calculation distance and the second calculation distance.

In an embodiment, the second calculation distance is: the sum of a remaining path length of the transport instrument used to transport the shelf to be returned and a distance from a return point of the shelf to be returned to the shelf to be transported plus an equivalent distance length the transport instrument walks during the time to place the shelve to be returned.

In an embodiment, the performing the optimal path planning for the shelf in the transport task based on the waiting time includes: in the case that the shelf in the transport task is required by multiple work stations, selecting a path of the shelf in the transport task according to the minimum waiting time; wherein: selecting a path of the shelf in the transport task according to the minimum waiting time includes: determining the time consumption of moving the shelf in the transport task to each work station; and selecting the transport path that with the least time consumption.

In an embodiment, the time consumption is the sum of distance transportation time, queue waiting time and shelf rotation time.

In an embodiment, the method further includes: generating transport tasks preferentially for high-priority orders.

In an embodiment, before generating the transport task, the method further includes: performing order grouping, wherein performing the order grouping includes performing order combination and work station allocation.

In an embodiment, the performing order combination includes: establishing an association relationship among orders according to inventory; and performing clustering combination according to the association relationship among orders.

In an embodiment, the establishing an association relationship among orders according to inventory includes: establishing strong correlation among orders with a same SKU or SKUs stored on a same shelf.

In an embodiment, the performing work station allocation includes: allocating orders to work stations according to the distance optimum principle when performing the order combination; and performing load administration on tasks of adjacent work stations according to the balance of task load of work stations.

In an embodiment, the method further includes: performing inventory layout, shelf adjustment and goods location matching.

In an embodiment, the inventory layout includes a decentralized storage strategy and a random storage strategy; the decentralized storage strategy includes: dispersing stock items on multiple shelves for storage; and the random storage strategy includes: selecting shelves randomly for storage in partitions of the shelf area.

In an embodiment, the decentralized storage strategy further includes: when the number of items stored on a single shelf exceeds the minimum number of item storage, the items are stored on other shelves.

In an embodiment, the minimum number of item storage satisfies the following condition: $k=\max(m1, m2, n/2*w)$, wherein w is the number of sorting work locations, n is the total storage number of items, m1 is the maximum number of items in item order lines of the order structure, m2 is the daily sales volume of items, and k is the minimum number of item storage.

In an embodiment, the random storage strategy includes: a random strategy for goods location recommendation and a random strategy for worker operation; the random strategy for goods location recommendation includes: in the case of receiving a task of putting on shelves, calculating the popularity of an item according to the historical sales order data of the item, matching the popularity of the item with the popularity of a shelf to determine a shelf area, and selecting a goods location with space randomly in the determined shelf area; and the random strategy for worker operation includes: in the case of placing an item in a goods location, selecting a goods location according to the actual goods location volume, wherein selecting a goods location according to the actual goods location volume includes: selecting a goods location that has space and meets the mixing rule, and placing the item therein.

In an embodiment, the performing shelf adjustment includes: sorting shelf storage positions according to storage priority, sorting item inventory according to shelf popularity, and performing the interval matching between the sorted shelf storage positions and the shelf popularity; selecting an idle shelf storage position in the matching interval to place the shelf corresponding to the idle shelf storage position when completing the matching task; and performing the position exchange on shelves with unmatched popularity during the business idle time.

In an embodiment, the storage priority is determined by scoring according to the distance between each shelf storage position and the work location in the map; and the shelf popularity is determined by scoring the shelf according to the historical order information, order pool data, promotional information and inventory information.

In an embodiment, the performing goods location matching includes: weighting a volume matching factor and a weight matching factor of the item to obtain a matching degree, sorting by matching degree, and selecting a goods location with high matching degree preferentially.

In an embodiment, the volume matching factor is determined by calculating the number of items that can be placed on each shelf according to lengths, widths and heights of the items; and the weight matching factor is determined by calculating a floor height of a shelf where items should be placed according to the density of the items.

Another aspect of the technical solution of the present application provides a shelf transport device applied to a goods-to-person system, including:
- a task generating unit configured to generate a transport task based on a shelf to be transported;
- a tool allocation unit configured to allocate a transport instrument with the shortest running track for the transport task;
- a path planning unit configured to perform the optimal path planning for the shelf in the transport task based on the waiting time; and
- a task allocation unit configured to: for an order that is newly added to batch, select the shelf in the current transport task preferentially, and then generate a new transport task if the shelf in the current transport task cannot satisfy the order.

In an embodiment, the transport instrument is a mobile robot.

In an embodiment, the task generating unit includes:
- a new task allocation module configured to generate a transport task for each shelf selected by the order, wherein each transport task is performed by an independent transport instrument.

In an embodiment, the tool allocation unit further includes:
- a first distance calculation module configured to determine a first calculation distance from a nearest idle transport instrument to the shelf to be transported;
- a second distance calculation module configured to determine a second calculation distance from a transport instrument that is currently used to transport a shelf to be returned to the shelf to be transported; and
- a result selection module configured to select a transport instrument with the closest distance based on the first calculation distance and the second calculation distance.

In an embodiment, the second distance calculation module is further configured to: sum a remaining path length of the transport instrument used to transport the shelf to be returned and a distance from a return point of the shelf to be returned to the shelf to be transported plus an equivalent distance length the transport instrument walks during the time to place the shelve to be returned.

In an embodiment, the path planning unit is further configured to:
- in the case that a shelf in the transport task is required by multiple work stations, select a path of the shelf in the transport task according to the minimum waiting time;
- wherein selecting a path of the shelf in the transport task according to the minimum waiting time, includes:
- determining time consumption of moving the shelf in the transport task to each work station;
- selecting a transport path with the least time consumption.

In an embodiment, the time consumption of moving the shelf in the transport task to each work station is the sum of distance transportation time, queue waiting time and shelf rotation time.

In an embodiment, the device further includes: a priority queue insertion module configured to generate transport tasks preferentially for high-priority orders.

In an embodiment, the device further includes: an order grouping unit configured to perform order grouping, wherein the order grouping unit includes an order combination module and a work station allocation module.

In an embodiment, the order combination module includes: an order association establishment module configured to establish an association relationship among orders according to inventory; and a cluster combination module configured to perform clustering combination according to the association relationship among orders.

In an embodiment, the order association establishment module is further configured to establish strong correlation among orders with a same SKU or SKUs stored on a same shelf.

In an embodiment, the work station allocation module includes at least one of:
- a order allocation module configured to allocate orders to work stations according to the distance optimum principle when performing the order combination;
- a load administration module configured to perform load administration on tasks of adjacent work stations according to the balance of task load of work stations.

In an embodiment, the device further includes:
- an inventory layout unit, a shelf adjustment unit and a goods location matching unit.

In an embodiment, the inventory layout unit includes: a decentralized storage strategy module and a random storage strategy module;
- the decentralized storage strategy module is configured to disperse the stock items on multiple shelves for storage;
- the random storage strategy module is configured to select and store shelves randomly in the partitions of the shelf area.

In an embodiment, the decentralized storage strategy module is further configured to:
when the number of items stored on a single shelf exceeds the minimum number of item storage, store the items on other shelves.

In an embodiment, the minimum number of item storage satisfies the following condition:
$k=\max(m1, m2, n/2*w)$, wherein w is the number of sorting work locations, n is the total storage number of items, m1 is the maximum number of items in item order lines of the order structure, m2 is the daily sales volume of items, and k is the minimum number of item storage.

In an embodiment, the random storage strategy module includes a random module for goods location recommendation and a random module for worker operation;
- the random module for goods location recommendation is configured to: in the case of receiving a task of putting on shelves, calculate the popularity of an item according to the historical sales order data of the item, match the popularity of the item with the popularity of a shelf to determine a shelf area, and select a goods location with space randomly in the determined shelf area;
- the random module for worker operation is configured to: in the case of placing an item in a goods location, select a goods location according to the actual goods location volume, wherein selecting a goods location according to the actual goods location volume includes: selecting a goods location that has space and meets the mixing rule, and placing the item therein.

In an embodiment, the shelf adjustment unit includes:
- an interval matching module configured to sort shelf storage positions according to storage priority, sort item inventory according to shelf popularity, and perform the interval matching between the sorted shelf storage positions and the shelf popularity;
- a shelf storage position selection module configured to select an idle shelf storage position in the matching interval to place the shelf corresponding to the idle shelf storage position when completing the matching task; and a shelf position exchange module configured to perform the position exchange on shelves with unmatched popularity during the business idle time.

In an embodiment, the storage priority is determined by scoring according to the distance between each shelf storage position and the work location in the map;

the shelf popularity is determined by scoring the shelf according to the historical order information, order pool data, promotional information and inventory information.

In an embodiment, the goods location matching unit is further configured to:

weight a volume matching factor and a weight matching factor of the item to obtain a matching degree, sort by matching degree, and select a goods location with high matching degree preferentially;

In an embodiment, the volume matching factor is determined by calculating the number of items that can be placed on each shelf according to lengths, widths and heights of the items; and the weight matching factor is determined by calculating a floor height of a shelf where items should be placed according to the density of the items.

Another aspect of the technical solution of the present application provides a shelf transport system applied to a goods-to-person system, including:

a transport instrument configured to transport shelves;
shelves configured to set goods locations for placing items and can be transported by the transport instrument;
a shelf area configured to place the shelves;
a server configured to run the shelf transport method applied to the goods-to-person system to schedule and configure the transport instrument and shelves.

In an embodiment, the transport instrument is a mobile robot.

In an embodiment, the mobile robot is a wheel-driven trolley with a jacking mechanism and with action abilities to walk in a straight line, walk in an arc and spot turn.

In an embodiment, the jacking mechanism and a body of the trolley move independently, including at least one of: the body of the trolley does not move while the jacking mechanism descends and lifts; the jacking mechanism rotates while the body of the trolley does not move; the body of the trolley and the jacking mechanism rotate at a same speed in the case that the body of the trolley and the jacking mechanism are locked; the body of the trolley and the jacking mechanism rotate at different speeds at the same time.

In an embodiment, the shelf is divided into multiple layers, and each layer of the shelf can be provided with goods locations in multiple directions.

In an embodiment, the shelf is square or rectangular, and each layer of the shelf can be provided with goods locations in 4 directions.

In an embodiment, the system further includes: a work station and a work location queuing area;

the work station is operation positions of workers;
the work location queuing area is an area set near the operation positions of the workers, and transport instruments transporting shelves are buffered and queued in this area to wait for the workers to operate.

The technical solution of the present application has the following beneficial effects:

In the shelf transport method and device applied to the goods-to-person system provided by the technical solution of the present application, the transport task is generated based on the shelf and the optimal path planning is performed based on the waiting time, thereby improving the efficiency of the goods-to-person system. This technical solution further optimizes the order grouping, inventory layout, shelf adjustment, and goods location matching, wherein the inventory dispersed layout is the basis for the optimal storage location selecting, the order grouping realizes the fewest selected shelves in the inventory, the shelf adjustment realizes the shortest transport distance, and the robot allocation makes the robot obtain the shortest path to the shelf, thereby further improving the efficiency of the goods-to-person system. Corresponding to the method and device, a shelf transport system applied to the goods-to-person system is also provided.

An embodiment of the present invention further provides a shelf selecting method, which includes:

selecting a shelf where an item is located in a shelf pool of a current work station according to the information of the item in a received order task;

if the shelf selected in the shelf pool of the current work station cannot satisfy all items in the order task, continuing to select a shelf where items with no selected shelf are located in shelves except the shelf pool of the current work station according to information of the items with no selected shelf in the order task.

In an embodiment, the method further includes:

in the case that the shelf selected in the shelf pool of the current work station cannot satisfy all items in the order task, selecting a shelf where items with no selected shelf are located successively in shelves that are not selected and shelf pools of work stations except the current work station according to the information of the items with no selected shelf in the order task, wherein the shelves that are not selected include shelves except shelf pools of all work stations in the warehouse.

In an embodiment, the selecting a shelf where an item is located in a shelf pool of the current work station according to the information of the item in a received order task, includes:

determining that the shelf pool of the current work station includes information of the shelf of the item according to the information of the item in the received order task;

selecting a shelf where the type number of items included exceeds a currently-set first threshold as a first target shelf in each shelf selecting process according to the determined shelf information; or sorting shelves based on the type number of items included on each shelf and selecting a first target shelf in terms of the sorting result in each shelf selecting process according to the determined shelf information.

In an embodiment, the continuing to select a shelf where items with no selected shelf are located in shelves except the shelf pool of the current work station according to information of the items with no selected shelf in the order task, includes:

determining information of the shelf where items with no selected shelf are located in shelves except the shelf pool of the current work station according to the information of the items with no selected shelf in the order task;

selecting a shelf where the type number of items with no selected shelf included exceeds a currently-set second threshold as a second target shelf in each shelf selecting process according to the information of the shelf where items with no selected shelf are located; or sorting shelves based on the type number of items with no selected shelf included on each shelf and selecting a second target shelf in terms of the sorting result in each shelf selecting process according to the information of the shelf where items with no selected shelf are located.

In an embodiment, the selecting a shelf where items with no selected shelf are located successively in shelves that are not selected and shelf pools of work stations except the current work station according to the information of the items with no selected shelf in the order task, includes:

selecting a shelf where the type number of items with no selected shelf included exceeds a currently-set third threshold in the shelves that are not selected as a third target shelf in each shelf selecting process according to the information of the items with no selected shelf in the order task; or sorting shelves in the shelves that are not selected based on the type number of items with no selected shelf included on each shelf and selecting a third target shelf in terms of the sorting result in each shelf selecting process according to the information of the items with no selected shelf in the order task;

in the case that there are still remaining items with no selected shelf in the order task after selecting the third target shelf, continuing to select a fourth target shelf in shelf pools of work stations except the current work station, wherein the fourth target shelf is a shelf where the type number of remaining items with no selected shelf included exceeds a currently-set fourth threshold in each shelf selecting process, or a shelf determined based on shelf sorting in each shelf selecting process.

In an embodiment, the selecting a shelf where the type number of items included exceeds a currently-set first threshold as a first target shelf in each shelf selecting process according to the determined shelf information, includes:

in the case that the number of shelves where the type number of items included exceeds the currently-set first threshold is greater than or equal to 2 in each shelf selecting process according to the determined shelf information, selecting a shelf that first entered the shelf pool of the current work station as the first target shelf according to a sequential order in which the shelves entered the shelf pool.

In an embodiment, the selecting a shelf where the type number of items with no selected shelf included exceeds a currently-set second threshold as a second target shelf in each shelf selecting process according to the information of the shelf where items with no selected shelf are located, includes:

in the case that the number of shelves where the type number of items with no selected shelf included exceeds the currently-set second threshold is greater than or equal to 2 in each shelf selecting process according to the information of the shelf where items with no selected shelf are located, selecting a shelf of which the distance from the current work station does not exceed a distance threshold as the second target shelf.

An embodiment of the present invention further provides a shelf selecting device, which includes:

a current shelf pool selecting module configured to: select a shelf where an item is located in a shelf pool of the current work station according to information of the item in the received order task;

a first selecting module outside shelf pool configured to: if the shelf selected in the shelf pool of the current work station cannot satisfy all items in the order task, continue to select a shelf where items with no selected shelf are located in shelves except the shelf pool of the current work station according to information of the items with no selected shelf in the order task.

In an embodiment, the device further includes:

a second selecting module outside shelf pool configured to: in the case that the shelf selected in the shelf pool of the current work station cannot satisfy all items in the order task, select a shelf where items with no selected shelf are located successively in shelves that are not selected and shelf pools of work stations except the current work station according to the information of the items with no selected shelf in the order task, wherein the shelves that are not selected include shelves except shelf pools of all work stations in the warehouse.

In an embodiment, the current shelf pool selecting module includes:

a shelf pool information determining unit configured to: determine that the shelf pool of the current work station includes information of the shelf of the item according to the information of the item in the received order task;

a shelf pool selecting unit configured to: select a shelf where the type number of items included exceeds a currently-set first threshold as a first target shelf in each shelf selecting process according to the determined shelf information; or a shelf pool selecting unit configured to: sort shelves based on the type number of items included on each shelf and select a first target shelf in terms of the sorting result in each shelf selecting process according to the determined shelf information.

In an embodiment, the first selecting module outside shelf pool includes:

a first information determining unit configured to: in the case that the shelf selected in the shelf pool of the current work station cannot satisfy all items in the order task, determine information of the shelf where items with no selected shelf are located in shelves except the shelf pool of the current work station according to the information of the items with no selected shelf in the order task;

a second target shelf selecting unit configured to: select a shelf where the type number of items with no selected shelf included exceeds a currently-set second threshold as a second target shelf in each shelf selecting process according to the information of the shelf where items with no selected shelf are located; or a second target shelf selecting unit configured to: sort shelves based on the type number of items with no selected shelf included on each shelf and select a second target shelf in terms of the sorting result in each shelf selecting process according to the information of the shelf where items with no selected shelf are located.

In an embodiment, the second selecting module outside shelf pool includes:

a second information determining unit configured to: in the case that the shelf selected in the shelf pool of the current work station cannot satisfy all items in the order task, determine information of a shelf where items with no selected shelf are located successively in the shelves that are not selected and shelf pools of work stations except the current work station according to the information of the items with no selected shelf in the order task;

a third target shelf selecting unit configured to: select a shelf where the type number of items with no selected shelf included exceeds a currently-set third threshold in the shelves that are not selected as a third target shelf in each shelf selecting process according to the information of the items with no selected shelf in the order task; or a third target shelf selecting unit configured to: sort shelves in the shelves that are not selected based on the type number of items with no selected shelf included on each shelf and select a third target shelf in terms of the sorting result in each shelf selecting process according to the information of the items with no selected shelf in the order task;

a fourth target shelf selecting unit configured to: in the case that there are still remaining items with no selected shelf in the order task after selecting the third target shelf, continue to select a fourth target shelf according to information of a shelf where the remaining items with no selected shelf are located determined in the shelf pools of work stations except the current work station, wherein the fourth target shelf is a shelf where the type number of remaining items with no selected shelf included exceeds a currently-set fourth threshold in each shelf selecting process, or a shelf determined based on shelf sorting in each shelf selecting process.

In an embodiment, the shelf pool selecting unit is further configured to:

in the case that the number of shelves where the type number of items included exceeds the currently-set first threshold is greater than or equal to 2 in each shelf selecting process according to the determined shelf information, select a shelf that first entered the shelf pool of the current work station as the first target shelf according to a sequential order in which the shelves entered the shelf pool.

In an embodiment, the second target shelf selecting unit is further configured to:

in the case that the number of shelves where the type number of items with no selected shelf included exceeds the currently-set second threshold is greater than or equal to 2 in each shelf selecting process according to the information of the shelf where items with no selected shelf are located, select a shelf of which the distance from the current work station does not exceed a distance threshold as the second target shelf.

An embodiment of the present invention further provides a server, including:

one or more processors;

a storage device for storing one or more programs, when the one or more programs are executed by the one or more processors, the one or more processors implement the shelf selecting method described in any embodiment of the present invention.

An embodiment of the present invention further provides a computer-readable storage medium storing a computer program thereon, where the program, when executed by a processor, implements the shelf selecting method described in any embodiment of the present invention.

In the embodiments of the present invention, the shelf where the item is located is preferentially selected in the shelf pool of the current work station according to the information of the item in the received order task; if the shelf selected in the shelf pool of the current work station cannot satisfy all the items in the order task, it is continued to select the shelf where the items with no selected shelf are located in shelves except the shelf pool of the current work station. The embodiments of the present invention solve the problem of low picking efficiency when the order tasks are issued in batches in the "goods-to-person" robot system, realize the efficient combination and selecting of the shelves where the items in the order tasks are located, reduce the number of times the robot transports the shelves, improve the picking efficiency and the order processing timeliness.

An embodiment of the present invention further provides a shelf location adjustment method, which includes:

determining shelf popularity levels and location popularity levels corresponding to at least some shelves in a warehouse according to a preset period, and saving them in a shelf information table;

when a location adjustment condition is generated, querying whether there is at least one candidate shelf in the shelf information table if a shelf popularity level of a current shelf is greater than a location popularity level corresponding to the current shelf; wherein a shelf popularity level corresponding to the candidate shelf is less than a location popularity level corresponding to the candidate shelf;

when at least one candidate shelf in the shelf information table is found, determining a target shelf that exchanges locations with the current shelf in the at least one candidate shelf;

controlling the robot to transport the current shelf to the location where the target shelf is located and transport the target shelf to the location where the current shelf is located.

In an embodiment, the determining a target shelf that exchanges locations with the current shelf in the at least one candidate shelf, includes:

judging whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf;

when there is at least one target shelf in the at least one candidate shelf, determining a target shelf that exchanges locations with the current shelf in the at least one target shelf.

In an embodiment, the shelf adjustment condition includes: before a shelf needs to be returned from a location of any work station in the warehouse to a location of the shelf, or when a shelf is idle.

In an embodiment, determining location popularity levels corresponding to at least some shelves in a warehouse according to a preset period, includes:

for any one of at least some shelves in the warehouse, calculating an average value of optimal paths from the location of the shelf to each work station according to the location of the shelf and the location of each work station in the warehouse;

determining the location popularity levels corresponding to at least some shelves in the warehouse according to the average value of optimal paths from the location of the shelf to each work station; wherein the smaller the average value of optimal paths, the greater the location popularity level corresponding to the shelf.

In an embodiment, determining shelf popularity levels corresponding to at least some shelves in a warehouse according to a preset period, includes:

for any one of at least some shelves in the warehouse, calculating a shelf score of the shelf according to a sales impact factor corresponding to the shelf;

determining the shelf popularity levels corresponding to at least some shelves in the warehouse according to the shelf score of the shelf, wherein the smaller the shelf score, the greater the shelf popularity level corresponding to the shelf.

In an embodiment, the calculating a shelf score of the shelf according to a sales impact factor corresponding to the shelf, includes:

calculating predicted sales volume of items on the shelf according to sales volume impact factors corresponding to the items on the shelf and weights corresponding to the sales volume impact factors; wherein the sales volume impact factors include at least one of: order pool factor, historical sales volume factor, historical stacking factor, inventory factor and designated sales volume factor;

calculating the shelf score of the shelf according to the predicted sales volume of items on the shelf, the total inventory of the warehouse, and the number of items on the shelf.

An embodiment of the present invention further provides a shelf location adjustment device, which includes:

a popularity level determining module configured to: determine shelf popularity levels and location popularity levels corresponding to at least some shelves in a warehouse according to a preset period, and save them in a shelf information table;

a candidate shelf judging module configured to: when a location adjustment condition is generated, query whether there is at least one candidate shelf in the shelf information table if a shelf popularity level of a current shelf is greater than a location popularity level corresponding to the current shelf; wherein a shelf popularity level corresponding to the candidate shelf is less than a location popularity level corresponding to the candidate shelf;

a target shelf determining module configured to: when at least one candidate shelf in the shelf information table is found, determine a target shelf that exchanges locations with the current shelf in the at least one candidate shelf;

a shelf location adjustment module configured to: control the robot to transport the current shelf to the location where the target shelf is located and then transport the target shelf to the location where the current shelf is located.

In an embodiment, the target shelf determining module includes:

a target shelf judging unit configured to: judge whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf;

a target shelf determining unit configured to: when there is at least one target shelf in the at least one candidate shelf, determine a target shelf that exchanges locations with the current shelf in the at least one target shelf.

In an embodiment, the location adjustment condition includes: before a shelf needs to be returned from a location of any work station in the warehouse to a location of the shelf, or when a shelf is idle.

In an embodiment, the popularity level determining module includes:

an optimal path calculation unit configured to: for any one of at least some shelves in the warehouse, calculate an average value of optimal paths from the location of the shelf to each work station according to the location of the shelf and the location of each work station in the warehouse;

a location popularity determining unit configured to: determine the location popularity levels corresponding to at least some shelves in the warehouse according to the average value of optimal paths from the location of the shelf to each work station; wherein the smaller the average value of optimal paths, the greater the location popularity level corresponding to the shelf.

In an embodiment, the popularity level determining module further includes:

a shelf score calculation unit configured to: for any one of at least some shelves in the warehouse, calculate a shelf score of the shelf according to a sales impact factor corresponding to the shelf;

a shelf popularity determining module configured to: determine the shelf popularity levels corresponding to at least some shelves in the warehouse according to the shelf score of the shelf, wherein the smaller the shelf score, the greater the shelf popularity level corresponding to the shelf.

In an embodiment, the shelf score calculation unit includes:

a predicted sales volume calculation subunit configured to: calculate predicted sales volume of items on the shelf according to sales volume impact factors corresponding to the items on the shelf and weights corresponding to the sales volume impact factors; wherein the sales volume impact factors include at least one of: order pool factor, historical sales volume factor, historical stacking factor, inventory factor and designated sales volume factor;

a shelf score calculation subunit configured to: calculate the shelf score of the shelf according to the predicted sales volume of items on the shelf, the total inventory of the warehouse, and the number of items on the shelf.

An embodiment of the present invention further provides a computer device, which includes:

one or more processors;

a storage device for storing one or more programs, when the one or more programs are executed by the one or more processors, the one or more processors implement the shelf location adjustment method as described above.

An embodiment of the present invention further provides a computer-readable storage medium storing a computer program thereon, where the program, when executed by a processor, implements the shelf location adjustment method as described above.

In the technical solution of the embodiment of the present invention, the shelf popularity levels and location popularity levels corresponding to at least some shelves in the warehouse are determined according to the preset period and saved in a shelf information table; when the location adjustment condition is generated, it is queried whether there is at least one candidate shelf in the shelf information table if the shelf popularity level of the current shelf is greater than the location popularity level corresponding to the current shelf; wherein the shelf popularity level corresponding to the candidate shelf is less than the location popularity level corresponding to the candidate shelf; the target shelf that exchanges locations with the current shelf is determined in the at least one candidate shelf when at least one candidate shelf is queried in the shelf information table; and the robot is controlled to transport the current shelf to the location where the target shelf is located and transport the target shelf to the location where the current shelf is located. The embodiment of the present invention solves the problems of long transport distance, long transport time and low picking efficiency of the current shelf in the process of transporting the current shelf to the work station by the robot, reduces the movement distance of the robot, reduces the number of times of shelf transports, shortens the transport time, and improves the picking efficiency.

DETAILED DESCRIPTION OF THE EMBODIMENTS

It should be clear that the described embodiments are merely a part of the embodiments of the present application but not all the embodiments. Based upon the embodiments of the present application, all of other embodiments obtained by those ordinary skilled in the art without creative work pertain to the protection scope of the present application.

Figure 1:
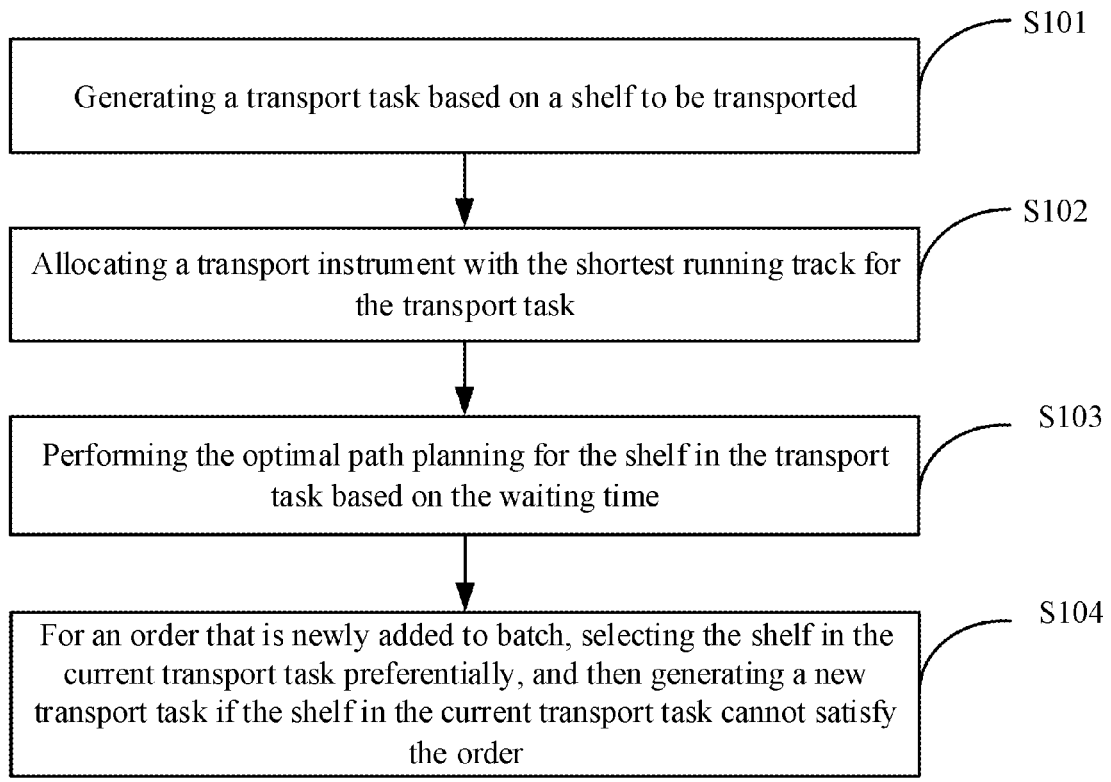
FIG. 1 is a flowchart of a shelf transporting method applied to the goods-to-person system according to an embodiment of the present invention.

As shown in FIG. 1, a shelf transporting method applied to a goods-to-person system includes: operation S101 to operation S104.

Operation S101: generating a transport task based on a shelf to be transported.

Operation S102: allocating a transport instrument with the shortest running track for the transport task.

Operation S103: performing the optimal path planning for the shelf in the transport task based on the waiting time.

Operation S104: for an order that is newly added to batch, selecting the shelf in the current transport task preferentially, and then generating a new transport task if the shelf in the current transport task cannot satisfy the order.

As an exemplary embodiment, the transport instrument is a mobile robot.

After a shelf is selected for the order, a shelf transport task will be generated.

As an exemplary embodiment, the operation of generating a transport task based on a shelf to be transported may be, for example:

generating a transport task for each shelf selected by the order, where each transport task is performed by an independent transport instrument.

Figure 2:
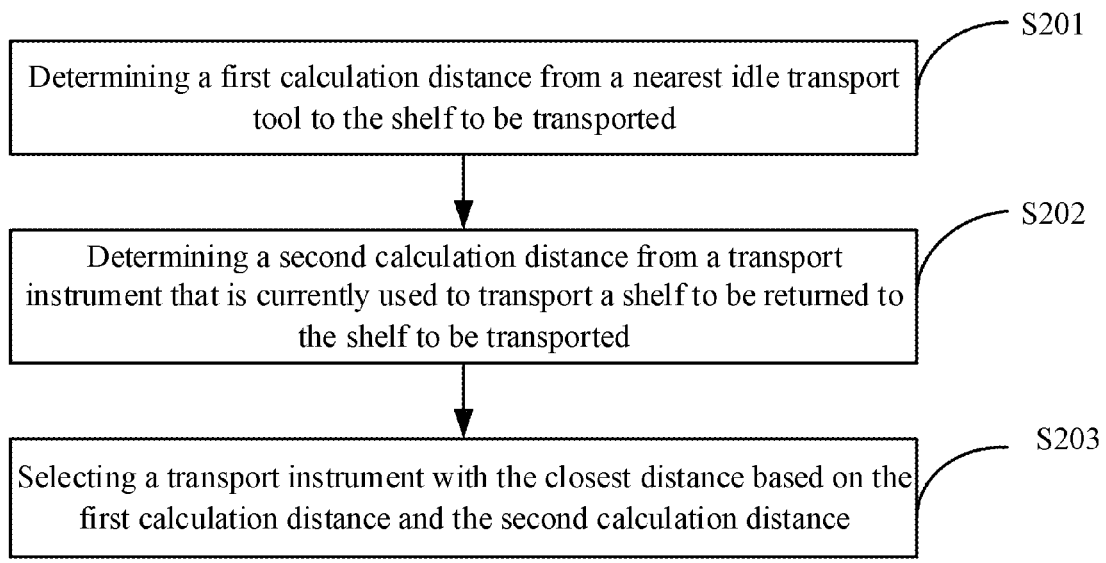
FIG. 2 is a flowchart of allocating transportation tools in the shelf transporting method according to an embodiment of the present invention.

As an exemplary embodiment, as shown in FIG. 2, the above operation of allocating a transport instrument with the shortest running track for the transport task may include, for example, operation S201, operation S202 and operation S203.

Operation S201: determining a first calculation distance from a nearest idle transport instrument to the shelf to be transported.

Operation S202: determining a second calculation distance from a transport instrument currently used to transport a shelf to be returned to the shelf to be transported.

Figure 8:
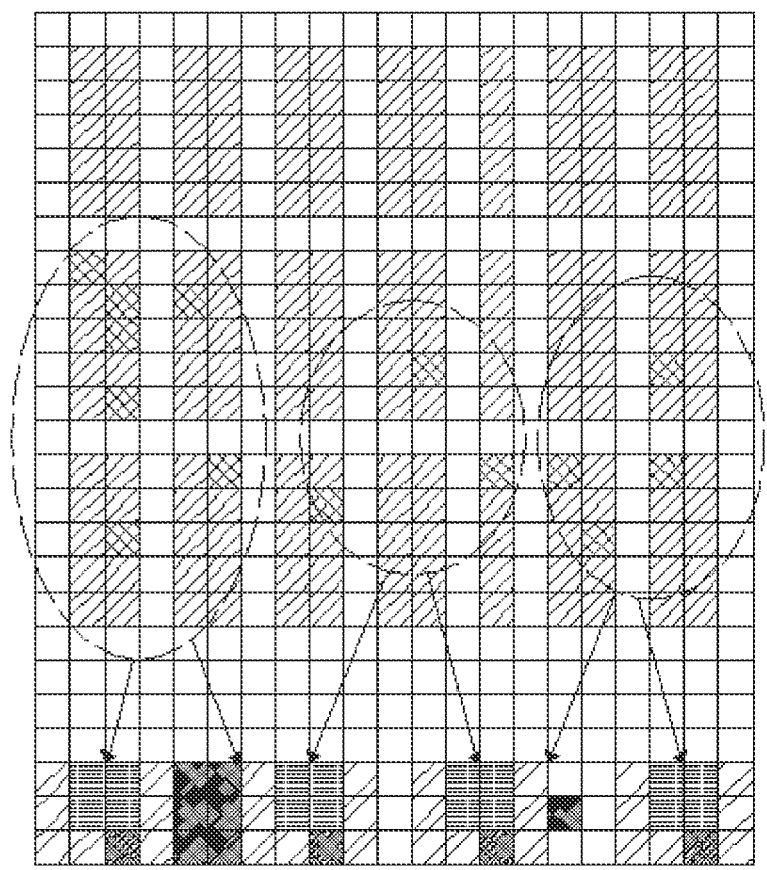
FIG. 8 is a structural schematic diagram of mobile robot allocation in an embodiment of the present invention.

Operation S203: selecting a transport instrument with the closest distance based on the first calculation distance and the second calculation distance. The disassembly of the transport instrument can be shown in FIG. 8.

As an exemplary embodiment, the second calculation distance may be, for example, the sum of the remaining path length of the transport instrument used to transport the shelf to be returned and the distance from the return point of the shelf to be returned to the shelf to be transported, plus the equivalent distance length the transport instrument walks during the time to place the shelf to be returned.

Figure 3:
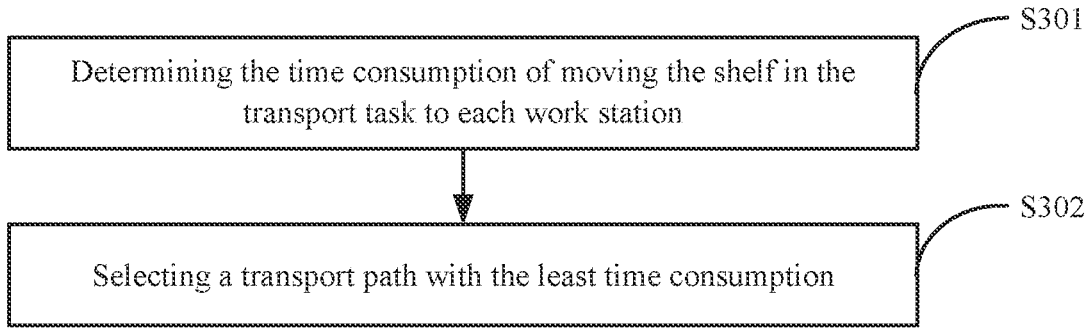
FIG. 3 is a flowchart of path selection in the shelf transporting method according to an embodiment of the present invention.

As an exemplary embodiment, in the above operation of performing the optimal path planning for the shelf in the transport task based on the waiting time:

as shown in FIG. 3, when the shelf in the transport task is required by multiple work stations, the path of the shelf in the transport task is selected according to the minimum waiting time, which may be shown, for example, operation S301 and operation S302.

Operation S301: determining the time consumption of moving the shelf in the transport task to each work station.

Operation S302: selecting a transport path with the least time consumption.

As an exemplary embodiment, the above-mentioned time consumption is the sum of distance transportation time, queue waiting time and shelf rotation time.

As an exemplary embodiment, before generating the transport task in operation S101, the method further includes: performing order grouping, which includes performing order combination and work station allocation. The order grouping is performed so that the transport task selects the smallest set of shelves and the total transport distance is shortest.

Figure 4:
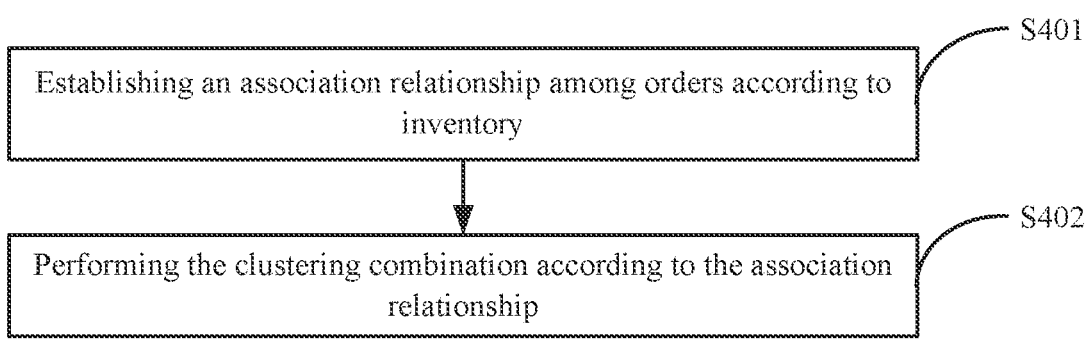
FIG. 4 is a flowchart of order combination in the shelf transporting method according to an embodiment of the present invention.

As an exemplary embodiment, as shown in FIG. 4, the order combination may include, for example, operation S401 and operation S402.

Operation S401: establishing an association relationship among orders according to inventory.

Operation S402: performing the clustering combination according to the above association relationship.

As an exemplary embodiment, in the above association relationship among orders established according to inventory, the orders having the same Stock Keeping Unit (SKU) or SKUs stored on the same shelf are strongly associated.

Figure 5:
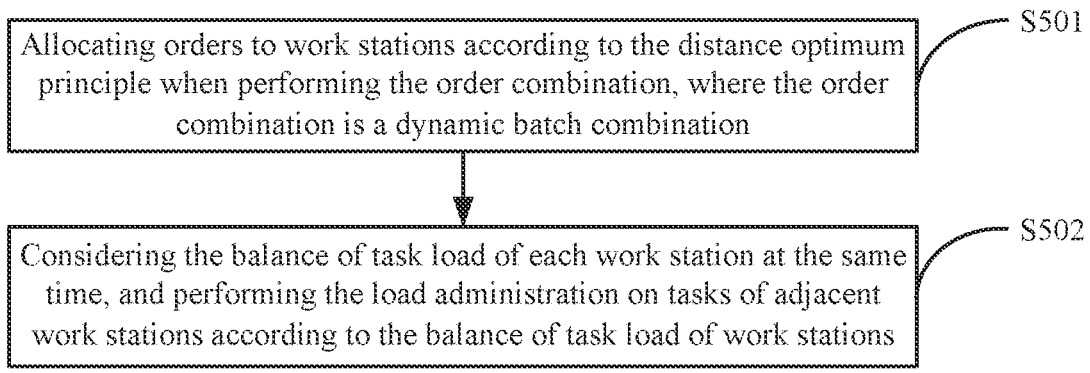
FIG. 5 is a flowchart of work station allocation in the shelf transporting method according to an embodiment of the present invention.

As an exemplary embodiment, as shown in FIG. 5, the work station allocation may include, for example, operation S501 and operation S502.

Operation S501: allocating orders to work stations according to the distance optimum principle when performing the order combination, where the order combination is a dynamic batch combination.

And

Operation S502: considering the balance of task load of each work station at the same time, and performing the load administration on tasks of adjacent work stations according to the balance of task load of work stations.

As an exemplary embodiment, before operation S101, the method further includes inventory layout, shelf adjustment and goods location matching.

As an exemplary embodiment, the inventory layout may include, for example, a decentralized storage strategy and a random storage strategy;

the decentralized storage strategy: dispersing the stock items on multiple shelves for storage;
the random storage strategy: selecting and storing shelves randomly in the partitions of the shelf area.

Inventory layout, decentralized storage:
the decentralized storage is to disperse the item inventory on multiple shelves for storage.

Advantages of decentralized storage: 1) there are more types of items stored on a single shelf, one shelf can satisfy more order lines when orders are combined, and the number of times of shelf transports is reduced; 2) for multi-item orders, the system's parallel processing capacity is increased; 3) a kind of items are stored on multiple shelves, and the system can select the closer shelf to satisfy orders.

The shelves are allocated to a plurality of logical partitions based on work locations, where each work location belongs to one logical partition, and a shelf is allocated into a logical partition closest to the shelf.

The shelves for decentralized storage are randomly selected in each partition.

The shelves are partitioned according to work locations, where each work location belongs to one partition, that is, each shelf is allocated into the nearest work location partition.

The dispersedly-stored shelves are randomly selected in each partition.

As an exemplary embodiment, the decentralized storage strategy may be, for example:
after the number of items stored on a single shelf exceeds the minimum number of item storage, the items are stored on other shelves.

Here, the minimum number of item storage satisfies the following condition: $k=\max(m1, m2, n/2*w)$, where w is the number of sorting work locations, n is the total storage number of items, m1 is the maximum number of items in item order lines of the order structure, m2 is the daily sales volume of items, and k is the minimum number of item storage. In order to avoid the order lines being split into multiple shelves for fulfillment, after the number of a certain kind of items stored on a certain shelf exceeds k, the items can be stored on other shelves.

Inventory layout, random storage:
The advantages of random storage: 1) the collection of items in a certain position of the storage area is avoided, and the items are evenly distributed in the popularity matching area, which helps to improve the parallel processing efficiency; 2) the workers judge the goods location volume more accurately, the random freedom of the workers is increased, the utilization rate of the goods location volume can be improved, and the greater number and more types of items stored on each shelf help to improve the shelf selected rate and improve the ability of a single shelf to meet more orders after reaching the work location.

As an exemplary embodiment, the random storage strategy includes a random strategy for goods location recommendation and a random strategy for worker operation;

the random strategy for goods location recommendation: when there is a task of stacking shelf, calculating the popularity of an item according to the historical sales order data of the item, matching the popularity of the item with the popularity of a shelf to determine a shelf area, and selecting a goods location with space randomly in the determined shelf area;

the random strategy for worker operation: when placing an item in a goods location, selecting a goods location according to the actual goods location volume, where selecting a goods location according to the actual goods location volume includes: selecting a goods location that has space and meets the mixing rule, and placing the item therein. At the work location for stacking a worker can randomly select the goods location through the interface according to the actual goods location volume. The items can be put as long as there is space and the mixing rule is met, giving the worker greater freedom of operation.

As an exemplary embodiment, the shelf adjustment is to place a frequently-used shelf in a position closer to the work location, so that the transport distance of the shelf is shorter.

Figure 6:
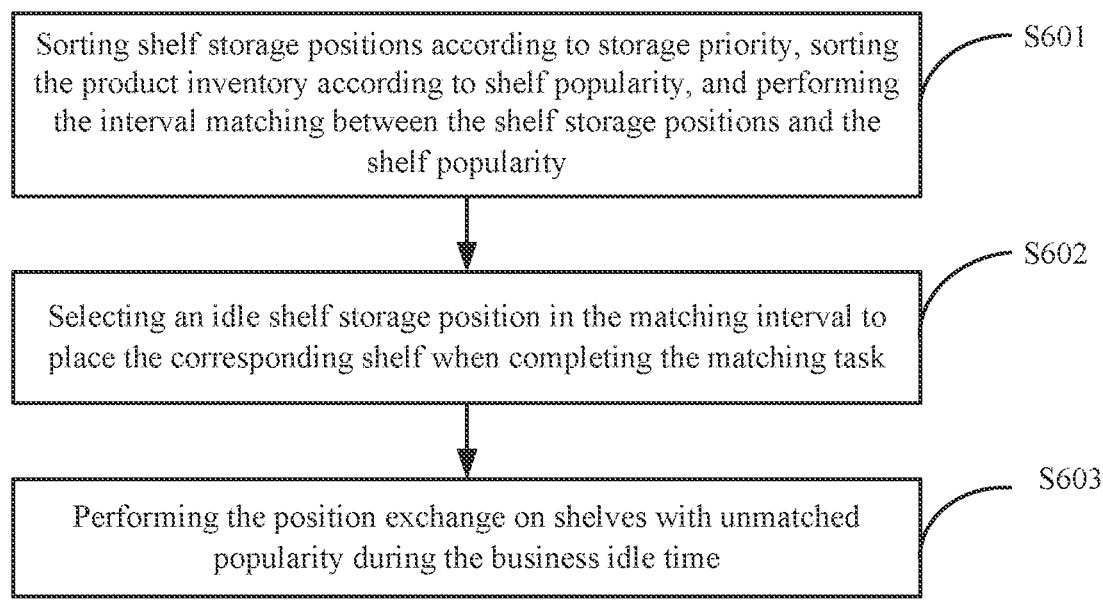
FIG. 6 is a flowchart of shelf adjustment in the shelf transporting method according to an embodiment of the present invention.

As shown in FIG. 6, the shelf adjustment may include, for example, operation S601, operation S602 and operation S603.

Operation S601: sorting shelf storage positions according to storage priority, sorting the item inventory according to shelf popularity, and performing the interval matching between the shelf storage positions and the shelf popularity.

Operation S602: selecting an idle shelf storage position in the matching interval to place the corresponding shelf when completing the matching task.

Operation S603: performing the position exchange on shelves with unmatched popularity during the business idle time.

The storage position priority is obtained by scoring the distance between each shelf storage position and the work location in the map;

the shelf popularity is obtained by scoring the shelf according to the historical order information, order pool data, sale information and inventory information.

Figure 7:
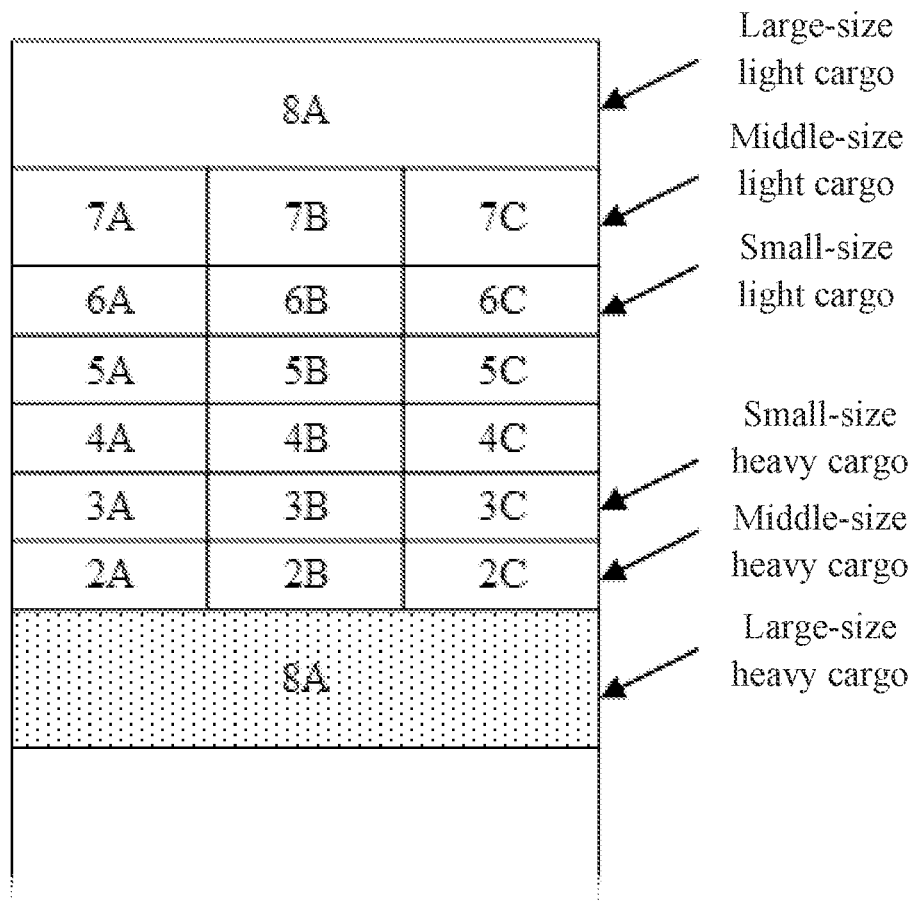
FIG. 7 is a structural schematic diagram of the shelf position arrangement in an embodiment of the present invention.

As an exemplary embodiment, as shown in FIG. 7, the goods location of the shelf is defined as a multi-type shelf.

Multiple types of shelves are supported to thereby match different item storage requirements and improve the shelf space utilization.

1) According to the customer's item characteristics and order structure, a variety of goods location types are designed to meet the storage needs of the customer for different types of items.

2) According to the length, width and height of the item, the number of this kind of items that can be placed in each goods location is calculated as a volume matching factor, so that the large goods location matches the large item and the small goods location matches the small item.

3) According to the density of an item, the floor height of the shelf where the item should be placed is calculated as a weight matching factor, so that a heavy item is placed in the lower layer of the shelf and a light item is placed in the upper layer of the shelf.

4) The volume matching factor and the weight matching factor are weighted to obtain the matching degree, sorting the goods locations based on matching degrees and a goods location with high matching degree is selected preferentially.

Orders that require high order timeliness and priority are cut in line for processing.

For a high-priority order, in order to meet the timeliness of the order, it is grouped preferentially and assigned to the work station, the shelf transport task is sent preferentially, and the robot is assigned preferentially, so as to meet the order with high timeliness requirement.

Figure 9:
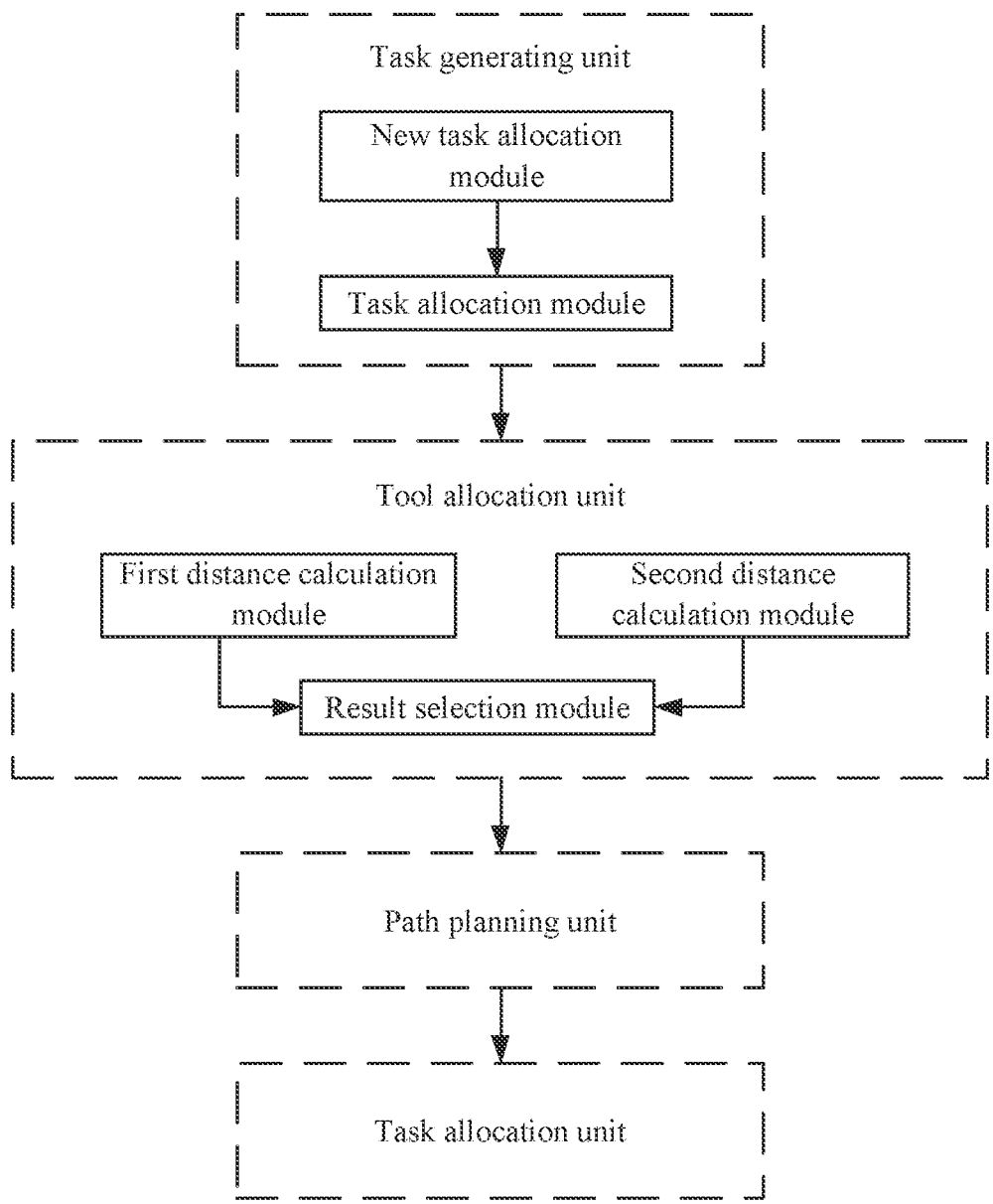
FIG. 9 is a structural block diagram of a shelf transporting apparatus applied to the goods-to-person system according to an embodiment of the present invention.

As shown in FIG. 9, a shelf transport apparatus applied to a goods-to-person system includes: a task generating unit, a tool allocation unit, a path planning unit and a task allocation module, where:

the task generating unit is configured to generate a transport task based on a shelf to be transported;

the tool allocation unit is configured to allocate a transport instrument with the shortest running track for the transport task;

the path planning unit is configured to perform the optimal path planning for the shelf in the transport task based on the waiting time;

and the task allocation module is configured to: for an order that is newly added to batch, select the current transport task preferentially and then generate a new transport task.

As an exemplary embodiment, the transport instrument is a mobile robot.

As an exemplary embodiment, the above-mentioned task generating unit includes: a new task allocation module.

The new task allocation module is configured to generate a transport task for each shelf selected by the order, where each transport task is performed by an independent transport instrument.

As an exemplary embodiment, the tool allocation unit may include, for example, a first distance calculation module, a second distance calculation module, and a result selection module, wherein:

the first distance calculation module is configured to calculate a first calculation distance from a nearest idle transport instrument to the shelf to be transported;

the second distance calculation module is configured to calculate a second calculation distance from a transport instrument that is currently used to transport a shelf to be returned to the shelf to be transported;

and the result selection module is configured to select a transport instrument with the closest distance based on the first calculation distance and the second calculation distance.

As an exemplary embodiment, the calculation process of the second distance calculation module may be: summing the remaining path length of the transport instrument to return the shelf in the transport and the distance length from the return point of the transport instrument to the shelf to be transported plus the equivalent distance length the transport instrument walks during the time to place the shelve in the transport.

As an exemplary embodiment, the path planning unit is further configured to:

when the shelf in the transport is required by multiple work stations, select the path of the shelf in the transport according to the minimum waiting time, which may be, for example:

calculate the time consumption of moving the shelf in the transport to each work station;

select a transport path with the least time consumption.

As an exemplary embodiment, the time consumption in the path planning unit is the sum of distance transportation time, queue waiting time and shelf rotation time.

As an exemplary embodiment, the apparatus further includes an order grouping unit including an order combination module and a work station allocation module.

As an exemplary embodiment, the order combination module includes: an order association establishing module and a clustering combination module, wherein:

the order association establishing module is configured to: establish an association relationship among the orders according to inventory;

and the clustering combination module is configured to: perform a clustering combination according to the above association relationship.

As an exemplary embodiment, in the order association establishing module, the orders having the same SKU or SKUs stored on the same shelf are strongly associated.

As an exemplary embodiment, the work station allocation module includes an order allocation module and/or a load administration module, wherein:

the order allocation module is configured to allocate orders to work stations according to the distance optimum principle when performing the order combination;

the load administration module is configured to perform the load administration on tasks of adjacent work stations according to the balance of task load of work stations.

As an exemplary embodiment, the apparatus further includes: an inventory layout unit, a shelf adjustment unit, and a goods location matching unit.

As an exemplary embodiment, the inventory layout unit includes a decentralized storage strategy module and a random storage strategy module; wherein:
the decentralized storage strategy module is configured to disperse the stock items on multiple shelves for storage;
the random storage strategy module is configured to select and store shelves randomly in the partitions of the shelf area.

As an exemplary embodiment, the decentralized storage strategy module is:
after the number of items stored on a single shelf exceeds the minimum number of item storage, the items are stored on other shelves.

As an exemplary embodiment, the minimum number of item storage satisfies the following condition: k=max(m1, m2, n/2*w), where w is the number of sorting work locations, n is the total storage number of items, m1 is the maximum number of items in item order lines of the order structure, m2 is the daily sales volume of items, and k is the minimum number of item storage.

As an exemplary embodiment, the random storage strategy module includes a random module for goods location recommendation and a random module for worker operation; wherein:
the random module for goods location recommendation is configured to:
when there is a task of stacking shelf, calculate the popularity of an item according to the historical sales order data of the item, match the popularity of the item with the popularity of a shelf to determine a shelf area, and select a goods location with space randomly in the determined shelf area;
the random module for worker operation is configured to:
when placing an item in a goods location, select a goods location according to the actual goods location volume, where the items can be put as long as there is space and the mixing rule is met.

As an exemplary embodiment, the shelf adjustment unit includes:
an interval matching module configured to sort shelf storage positions according to storage priority, sort the item inventory according to shelf popularity, and perform the interval matching between the shelf storage positions and the shelf popularity;
a shelf storage position selection module configured to select an idle shelf storage position in the matching interval to place the corresponding shelf when completing the matching task;
and
a shelf position exchange module configured to perform the position exchange on shelves with unmatched popularity during the business idle time.

As an exemplary embodiment, the storage position priority is obtained by scoring the distance between each shelf storage position and the work location in the map;
the shelf popularity is obtained by scoring the shelf according to the historical order information, order pool data, promotional information and inventory information.

As an exemplary embodiment, the goods location matching unit may, for example, weight a volume matching factor and a weight matching factor of the item to obtain the matching degree, sort the goods locations based on matching degrees, and select a goods location with high matching degree preferentially.

As an exemplary embodiment, the volume matching factor is obtained by calculating the number of items that can be placed on each shelf according to lengths, widths and heights of the items;
the weight matching factor is obtained by calculating a floor height of a shelf where items should be placed according to the density of the items.

Figure 10:
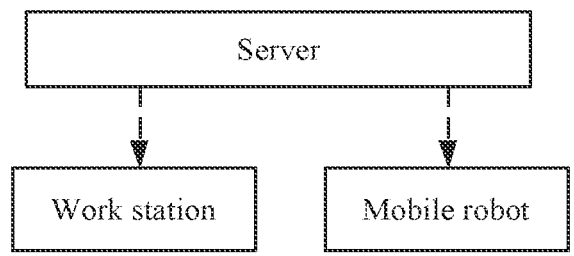
FIG. 10 is a structural block diagram of a shelf transporting system applied to the goods-to-person system according to an embodiment of the present invention.

As shown in FIG. 10, a shelf transport system applied to a goods-to-person system includes:
a transport instrument configured to transport shelves;
shelves configured to set goods locations for placing items and can be transported by the transport instrument;
a shelf area configured to place the shelves.

In an embodiment, the shelves are partitioned according to work locations to obtain a plurality of work location partitions, wherein each work location belongs to one work location partition, and a shelf is divided into a work location partition closest to the shelf. It should be noted that such partition is a logical partition.

A server is configured to run the shelf transport method applied to the goods-to-person system of this technical solution to schedule and configure the transport instrument and shelves.

As an exemplary embodiment, the transport instrument is a mobile robot.

As an exemplary embodiment, the mobile robot is a wheel-driven trolley with a jacking mechanism and with action abilities to walk in a straight line, walk in an arc and spot turn.

As an exemplary embodiment, the jacking mechanism and the trolley body move independently, implementing that: the trolley body does not move while the jacking mechanism descends and lifts; the trolley body does not move while the jacking mechanism rotates, the trolley body and the jacking mechanism are locked and rotate at a same speed; the trolley body and the jacking mechanism rotate at different speeds at the same time.

As an exemplary embodiment, the shelf is divided into multiple layers, and each layer of the shelf can be provided with goods locations in multiple directions.

As an exemplary embodiment, the shelf is square or rectangular, and each layer of the shelf can be provided with goods locations in 4 directions.

As an exemplary embodiment, the system further includes: a work station and a work location queuing area; wherein:
the work station: operation positions of workers;
the work location queuing area: an area set near the operation positions of the workers, and transport instruments transporting shelves are buffered and queued in this area to wait for the workers to operate.

It should be noted that the relational terms such as first and second herein are only used to distinguish one entity or operation from another and do not necessarily require or imply any such actual relationship or sequence between these entities or operations. And, the term "include", "contain" or any other variant is intended to encompass the non-exclusive inclusion, so that the process, method, object or equipment including a series of elements not only includes those elements, but also includes other elements which are not listed clearly or includes the elements inherent in such process, method, object or equipment. Without more restrictions, the element defined by the sentence "include a . . ." does not preclude the existence of another identical element in the process, method, object or equipment including the element.

Various embodiments in this specification are described in a related manner, the same or similar parts among the various embodiments can refer to each other, and each embodiment focuses on the differences from other embodiments.

The logics and/or operations represented in the flowcharts or described in other ways herein, for example, can be considered as a sequenced list of executable instructions for implementing logic functions, and can be specifically implemented in any computer-readable medium, for use by instruction execution systems, devices or equipments (such as computer-based systems, systems including processors, or other systems that can fetch and execute instructions from instruction execution systems, devices or equipments) or for use in combination with these instruction execution systems, devices or equipments. In terms of this specification, the "computer-readable medium" may be any device that can contain, store, communicate, propagate, or transmit programs for use by instruction execution systems, devices or equipments or in combination with these instruction execution systems, devices or equipments. More specific examples (non-exhaustive list) of computer-readable media include: electrical connection (electronic device) with one or more wires, portable computer disk (magnetic device), Random Access Memory (RAM), Read Only Memory (ROM), Erasable Programmable Read Only Memory (EPROM or flash memory), optical fiber device, and portable Compact Disk-Read Only Memory (CD-ROM). In addition, the computer-readable medium may even be paper or other suitable media on which the program can be printed, because it is possible to obtain the program electronically for example by optically scanning the paper or other media and then editing, interpreting or processing in other suitable way if necessary and then store it in the computer memory.

It should be understood that each part of the present invention can be implemented by hardware, software, firmware or a combination thereof.

In the above embodiments, multiple operations or methods can be implemented by software or firmware stored in a memory and executed by a suitable instruction execution system. For example, if they are implemented by hardware, as in another embodiment, they can be implemented by any one or a combination of the following technologies known in the art: discrete logic circuit with a logic gate circuit for implementing logic functions on data signals, application-specific integrated circuit with a suitable combinational logic gate circuit, Programmable Gate Array (PGA), Field Programmable Gate Array (FPGA), etc.

It can be understood that the term "a/an" should be understood as "at least one" or "one or more", that is, in one embodiment, the number of elements may be one, while in other embodiments, the number of elements may be more than one. The term "a/an" cannot be understood as the limitation on the number.

Although ordinal numbers such as "first", "second", etc. will be used to describe various components, but not limit those components here. This term is only used to distinguish one component from another. For example, the first component may be referred to as the second component, and likewise, the second component may also be referred to as the first component without departing from the teaching of the inventive concept. The term "and/or" as used herein includes any and all combinations of one or more relevant listed items.

The terms used herein are only for the purpose of describing various embodiments and not intended to limit them. As used herein, the singular form is intended to also include the plural form, unless the context clearly indicates the exception. In addition, it will be understood that the terms "include" and/or "have" when used in this specification specify the existence of the described features, numbers, operations, operations, components, elements or combinations thereof, but do not exclude the existence or addition of one or more other features, numbers, operations, operations, components, elements or combinations thereof.

The terms used herein, including technical and scientific terms, have the same meanings as those commonly understood by those skilled in the art, as long as the terms are not defined differently. It should be understood that the terms defined in commonly-used dictionaries have meanings consistent with the meanings of terms in the prior art.

An embodiment of the present application provides another shelf transport method applied to the goods-to-person system, wherein a shelf selecting method can be used for processing the newly-added batch orders, and the shelf selecting method includes: selecting, according to the received information of an item in an order task newly added to the batch, the shelf where the item are located in the shelf pool in the current transport task; in the case that the shelf selected in the shelf pool in the current transport task cannot satisfy all the items in the order task newly added to the batch, continuing to select a shelf where items with no selected shelf are located in shelves except the shelf pool in the current transport task according to the information of the items with no selected shelf in the order task.

Figure 11:
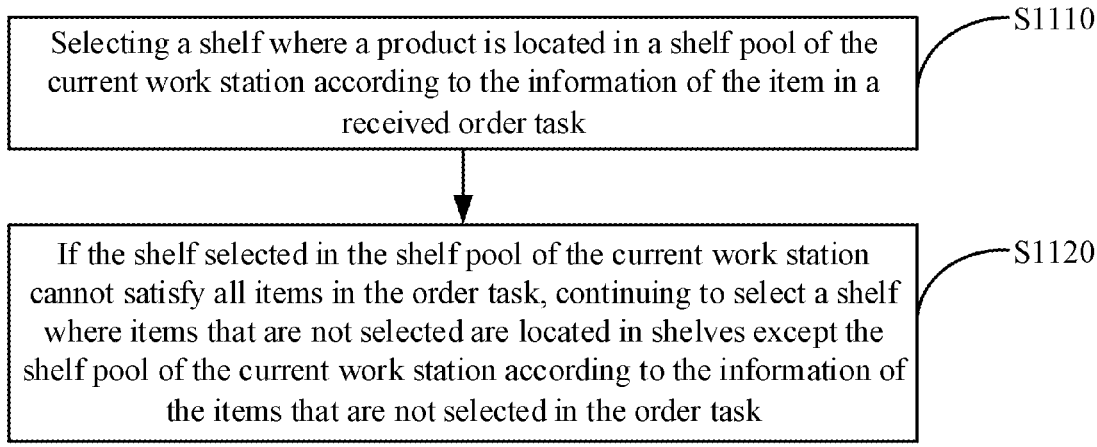
FIG. 11 is a flowchart of a shelf selecting method provided by an embodiment of the present invention.

FIG. 11 is a flowchart of a shelf selecting method provided by an embodiment of the present invention. This embodiment is applicable to the case of selecting a shelf according to an order task, and this method can be executed by a shelf selecting device, which can be implemented by software and/or hardware and can be integrated in a server. As shown in FIG. 11, the method includes: operation S1110 and operation S1120.

Operation S1110: selecting a shelf where an item is located in a shelf pool of the current work station according to the information of the item in a received order task. The warehouse area of the goods-to-person system is divided into shelf areas and work stations. The shelf area is an area where the shelves are placed, and the work station is an area where the staff picks goods. A warehouse can have one or more work stations. A work station can have one or more seeding walls. When the warehouse receives order tasks, the Warehouse Management System (WMS) on the warehouse terminal will assign multiple order tasks to the work stations, that is, put on the seeding walls, select the required shelves according to a certain selecting method, and at the same time enable the robot scheduling system to schedule robots to transport the shelves. The robots transport the shelves from the shelf area according to the instructions and send them to the work stations. The staff uses the seeding wall at the work station to pick the goods in a way of simultaneous picking and sorting.

The basic goal of picking the goods is to pick the items required in the order task from the shelves. The same kind of items can be located on different shelves in the warehouse, or even at different positions on the same shelf. The warehouse management system confirms that a certain quantity of a certain kind of items are picked from a certain shelf or goods location for a certain order task, which is the hitting process. The selected shelf is called the hit shelf In the order task, the item that has been confirmed to be picked from a certain shelf is called the hit item, and the item that has not been confirmed to be picked from a shelf is called the item that is not hit. When the warehouse management system allocates work stations to order tasks, it will set a corresponding shelf pool for each work station, where the shelf pool includes shelves that have been selected according to the information of the items in the order task of the work station but have not yet been picked. In the shelf pool, at least one shelf is waiting in line for picking.

The work stations are assigned the order tasks as a continuous process. When a next batch of order tasks is received, the shelves where the items in the previous batch of order tasks are located may have been selected but the picking has not yet been completed. With the allocation of order tasks, the shelves in the shelf pool are in the real-time changing state. When a work station receives a large number of new order tasks, the warehouse management system preferentially determines, according to the information of the items in the order tasks, whether there are shelves that meet the needs in the shelf pool of the current work station. If so, the shelves in the shelf pool are transported by robots, which can complete the picking of the items in the previous batch of historical order tasks, and can also complete the picking of the items in the current new order tasks, reducing the number of times the robots transport the shelves from the shelf area, and thus improving the picking efficiency and the order processing timeliness.

In an embodiment, the operation of selecting a shelf where an item is located in a shelf pool of the current work station according to the information of the item in a received order task, includes:

determining that the shelf pool of the current work station includes information of the shelf of the required item according to the information of the item in the received order task;

selecting a shelf where the type number of required items included exceeds a currently-set first threshold as a first target shelf in each shelf selecting process according to the determined shelf information; or sorting shelves based on the type number of required items included on each shelf and selecting a first target shelf in terms of the sorting result in each shelf selecting process according to the determined shelf information. For example, the sorting is performed in the order from large to small, and any of the top ones according to the sorting is selected as the first target shelf.

The same type of items can be stored on different shelves in the warehouse. There may be more than one shelf that meets the demand when processing the order task, and the shelf selecting process involved includes multiple selections. According to the information of the item in the received order task, the information of the shelf where the item is located is determined in the shelf pool, such as the shelf number, the number and types of items on the shelf that meet the order task. Each time the shelf is selected, a shelf where the type number of required items included exceeds the currently-set first threshold is selected as the first target shelf until the picking of all items in the order task is completed, wherein the first threshold can be set adaptively according to the picking requirement and the current shelf selecting rule, that is, the specific value of the first threshold can be adjusted in real time according to the picking situation in each shelf selecting process. By setting the first threshold, it is possible to give priority to selecting the shelf with the most types of required items in the shelf pool in each selecting process, thereby improving the processing efficiency of orders. In addition, it is also possible to sort the determined shelves based on the type number of required items included on each shelf, and select the first target shelf according to the sorting result. Specifically, all the shelves sorted at the top can be selected as the first target shelves, for example, the shelf sorted in the first is selected as the first target shelf.

Operation S1120: if the shelf selected in the shelf pool of the current work station cannot satisfy all items in the order task, continuing to select a shelf where items with no selected shelf are located in shelves except the shelf pool of the current work station according to the information of the items with no selected shelf in the order task.

If all the items required in the new order task can be picked out from the shelves selected in the shelf pool of the current work station, the operation S1120 does not need to be executed. If the shelf pool of the current work station cannot satisfy all the items in the new order task, it is continued to determine the shelf where the items with no selected shelf are located in the shelves except the shelf pool of the current work station according to the information of the items with no selected shelf in the order task, until the picking of all the items of the order task is completed.

In an embodiment, the operation of continuing to select a shelf where items with no selected shelf are located in shelves except the shelf pool of the current work station according to the information of the items with no selected shelf in the order task, includes:

determining the information of the shelf where items with no selected shelf are located in shelves except the shelf pool of the current work station according to the information of the items with no selected shelf in the order task;

selecting a shelf where the type number of items with no selected shelf included exceeds a currently-set second threshold as a second target shelf in each shelf selecting process according to the information of the shelf where items with no selected shelf are located; or sorting shelves based on the type number of items with no selected shelf included on each shelf and selecting a second target shelf in terms of the sorting result in each shelf selecting process according to the information of the shelf where items with no selected shelf are located. For example, the sorting is performed in the order from large to small, and any of the top ones according to the sorting is selected as the second target shelf.

The information of the shelf where items with no selected shelf are located in other shelves except the shelf pool of the current work station includes the shelf number, and the number and types of the items with no selected shelf included on the shelf. By setting the second threshold, the shelf with the most types of items with no selected shelf is selected as the second target shelf in each shelf selecting process, which can reduce the number of times the robots transport shelves and achieve the effect of improving the picking efficiency and order processing timeliness. Here, the second threshold can be adaptively set and adjusted according to the picking requirement and the current shelf selecting rule. In addition, it is also possible to sort the shelves based on the type number of items with no selected shelf included on each shelf to determine the second target shelf. Specifically, all the shelves sorted at the top can be selected as the second target shelves, and preferably, the shelf sorted in the first is selected as the second target shelf.

The shelf selecting method in this embodiment can be called the minimum shelf collection method. Especially when the items in the warehouse are distributed more dispersedly, the robots can transport the fewest shelves to implement the picking of the items required in the order task, improving the picking efficiency effectively.

In the technical solution of this embodiment, the shelf where the item is located is preferentially selected in the shelf pool of the current work station according to the information of the item in the received order task; if the shelf selected in the shelf pool of the current work station cannot satisfy all the items in the order task, it is continued to select the shelf where the items with no selected shelf are located in shelves except the shelf pool of the current work station. Also, during the shelf selecting process, the shelf including most types of items in the order task is preferentially selected. The embodiment of the present invention solves the problem of low picking efficiency when the order tasks are issued in batches in the "goods-to-person" robot system by using the above minimum shelf collection method, realizes the efficient combination and selecting of the shelves where the items in the order tasks are located in the shelf pool of the current work station and other shelves in addition to this shelf pool, reduces the number of times the robot transports the shelves, reduces the transportation cost of shelves, and improves the picking efficiency and the order processing timeliness.

Figure 12:
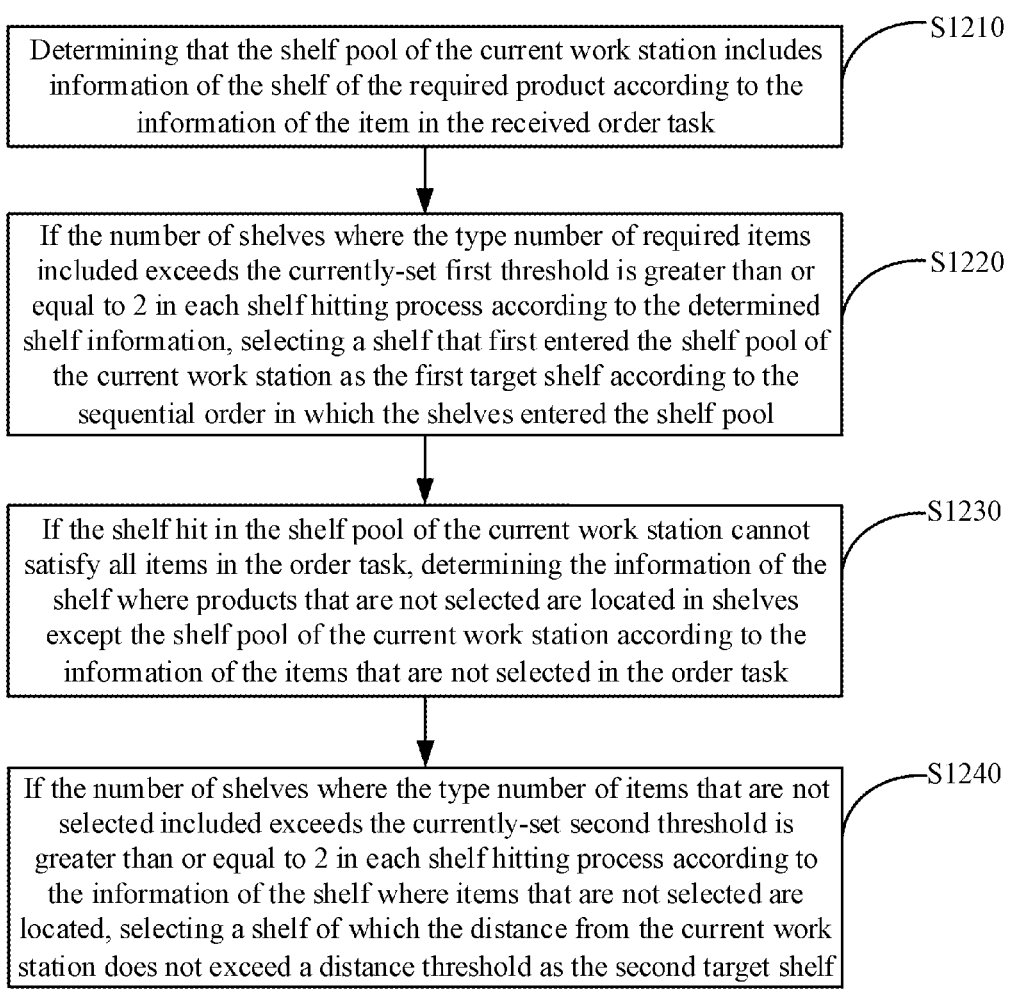
FIG. 12 is a flowchart of another shelf selecting method provided by an embodiment of the present invention.

FIG. 12 is a flowchart of another shelf selecting method provided by an embodiment of the present invention. As shown in FIG. 12, the method may include, for example, operation S1210 to operation S1240.

Operation S1210: determining that the shelf pool of the current work station includes information of the shelf of the required item according to the information of the item in the received order task.

Operation S1220: if the number of shelves where the type number of required items included exceeds the currently-set first threshold is greater than or equal to 2 in each shelf selecting process according to the determined shelf information, selecting a shelf that first entered the shelf pool of the current work station as the first target shelf according to the sequential order in which the shelves entered the shelf pool.

Considering that the shelves will be transported in the order of entering the shelf pool when the robot scheduling system schedules robots to transport the shelves, that is, the shelf that enters the shelf pool in the first place is transferred preferentially, the shelf including the most types of required items and entering the shelf pool firstly is selected preferentially in the shelf selecting process, which can further improve the order processing timeliness. In a similar way, if the number of first target shelves meeting the requirement based on the sorting of the shelves is greater than or equal to 2, then the shelf that first entered the shelf pool of the current work station is selected as the first target shelf according to the sequential order in which the shelves entered the shelf pool.

Operation S1230: if the shelf selected in the shelf pool of the current work station cannot satisfy all items in the order task, determining the information of the shelf where items with no selected shelf are located in shelves except the shelf pool of the current work station according to the information of the items with no selected shelf in the order task.

Operation S1240: if the number of shelves where the type number of items with no selected shelf included exceeds the currently-set second threshold is greater than or equal to 2 in each shelf selecting process according to the information of the shelf where items with no selected shelf are located, selecting a shelf of which the distance from the current work station does not exceed a distance threshold as the second target shelf.

The shelves in the shelf pool of the current work station have been determined to be transported to the current work station, so only the transportation sequence of the shelves in the shelf pool needs to be considered. Regarding whether a shelf other than the shelf pool of the current work station is selected, it is necessary to firstly determine the types of items with no selected shelf in the order task included in the shelf, and then perform the final determination according to the distance between the shelf and the current work station. The selecting of the shelf with the most types of items with no selected shelf and the closest distance to the work station can further reduce the shelf transport cost and further improve the picking efficiency and order processing timeliness. Similarly, if the number of second target shelves meeting the requirement based on the sorting of the shelves is greater than or equal to 2, then the shelf of which the distance from the current work station does not exceed the distance threshold is selected as the second target shelf.

The exemplary description of the foregoing minimum shelf collection method of this embodiment will be given below:

(1) The warehouse terminal runs the warehouse management system and sends the order task X to the seeding wall of a certain work station to trigger the shelf selecting method.

(2) The warehouse terminal creates a shelf set A. The shelf set A includes the shelves in the shelf pool of the work station where the order task X is located.

(3) The warehouse terminal performs the following cycle on the shelf set A. The purpose of this cycle is to preferentially select the shelf where the items in the order task X are located in the shelf pool of the current work station.

a1) Judge whether the shelf set A is empty. If the shelf set A is empty, meaning that the current work station has no shelf pool, then jump directly out of the following shelf pool cycle and enter the shelf cycle other than the shelf pool of the current work station in operation (4); otherwise, continue to the next operation.

b1) Calculate the types of items with no selected shelf in the order task X which can be selected by each shelf in the shelf set A. When the order task X has just been assigned to the current work station, all the items required on the order are items with no selected shelf. As some items are selected, the types of items with no selected shelf will gradually decrease.

c1) Judge whether the maximum number of the types of items with no selected shelf in the order task X which can be selected by each shelf is greater than 0. If it is equal to 0, meaning that the items with no selected shelf in the order task X cannot be found in the shelf pool of the current work station, then jump out of the cycle of this shelf pool and enter the other shelf cycle in operation (4); otherwise, continue to the next operation.

d1) Select the shelf with the most types of items with no selected shelf in the order task X, and select it as the shelf of the order task X. If there are multiple selected shelves with the type number of required items being equal to the maximum value, the shelf that entered the shelf pool firstly, i.e., the shelf that is firstly selected by the current work station, is selected for selection.

e1) Mark the items in the order task X that are selected by the selected shelf in operation d1) as selected, and delete the selected shelf in operation d1) from the shelf set A.

f1) judge whether there are any item that is not selected in the order task X. If not, meaning that all the items required in the order task X have been selected, then end the shelf selecting process of the order task X; otherwise, return to operation a1) to continue the cycle.

(4) Create a shelf set B. The shelf set B includes other shelves except the shelf pool of the current work station. The trigger condition for creating the shelf set B is: the shelf pool of the current work station cannot satisfy all the items in the order task X, and it is necessary to continue selecting a shelf in other shelves to complete the picking of all the items.

(5) Perform the following cycle on the shelf set B. The purpose of this cycle is to determine the shelf where the items with no selected shelf in the order task X are located in other shelves except the shelf pool of the current work station.

a2) Calculate the types of items with no selected shelf in the order task X which can be selected by each shelf in the shelf set B.

b2) Select the shelf with the most types of items with no selected shelf in the order task X, and select it as the shelf of the order task X. If there are multiple shelves with the type number of items with no selected shelf being equal to the maximum value, the shelf closest to the current work station is selected for selection.

c2) Mark the items in the order task X that are selected by the selected shelf in operation b2) as selected, and delete the selected shelf in operation b2) from the shelf set B.

d2) judge whether there are any item that is not selected in the order task X. If not, meaning that all the items in the order task X have been selected, then end the shelf selecting process; otherwise, return to operation a2) to continue the cycle.

In the technical solution of this embodiment, the shelf including the most types of required items and entering the shelf pool firstly is selected preferentially in the shelf pool of the current work station according to the information of the item in the received order task; if the shelf selected in the shelf pool of the current work station cannot satisfy all the items in the order task, it is continued to select the shelf with the most types of items with no selected shelf and the closest distance to the work station in shelves except the shelf pool of the current work station. The embodiment of the present invention solves the problem of low picking efficiency when the order tasks are issued in batches in the "goods-to-person" robot system, realizes the efficient combination and selecting of the shelves where the items in the order tasks are located in the shelf pool of the current work station and other shelves in addition to this shelf pool, reduces the number of times the robot transports the shelves, reduces the transportation cost of shelves, and improves the picking efficiency and the order processing timeliness.

Figure 13:
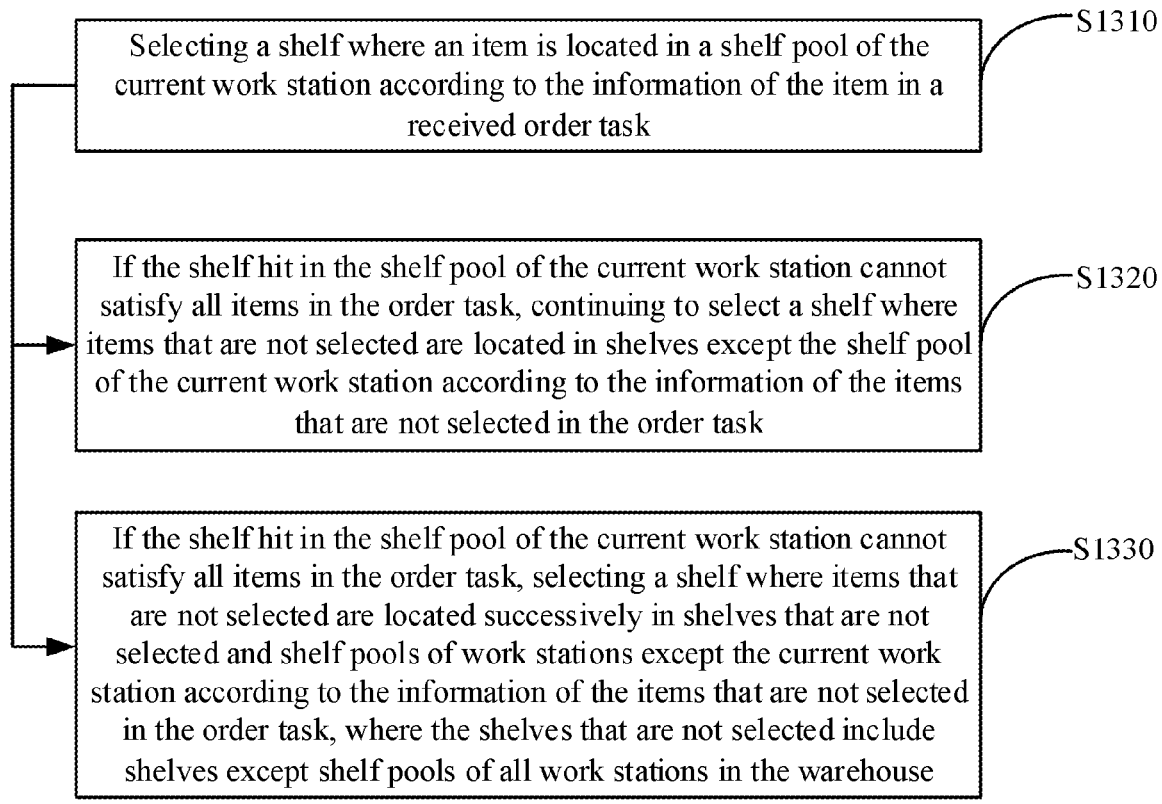
FIG. 13 is a flowchart of another shelf selecting method provided by an embodiment of the present invention.

FIG. 13 is a flowchart of another shelf selecting method provided by an embodiment of the present invention. As shown in FIG. 13, the method may include, for example, operation S1310, operation S1320 and operation S1330.

Operation S1310: selecting a shelf where an item is located in a shelf pool of the current work station according to the information of the item in a received order task.

Operation S1320: if the shelf selected in the shelf pool of the current work station cannot satisfy all items in the order task, continuing to select a shelf where items with no selected shelf are located in shelves except the shelf pool of the current work station according to the information of the items with no selected shelf in the order task.

Operation S1330: if the shelf selected in the shelf pool of the current work station cannot satisfy all items in the order task, selecting a shelf where items with no selected shelf are located successively in shelves that are not selected and shelf pools of work stations except the current work station according to the information of the items with no selected shelf in the order task, wherein the shelves that are not selected include shelves except shelf pools of all work stations in the warehouse.

For hot items, the distribution in the warehouse is usually concentrated, for example, hot items may only be distributed on a few designated shelves. When the demand for orders is large, different work stations share the entire shelf area in the warehouse, which is easy to cause the phenomenon that multiple work stations select the same shelf at the same time in order to complete their order tasks. The shelf that is repeatedly selected needs to be transported to one work station to complete the item picking, and then transported to another work station for item picking. This is bound to increase the time for another work station to wait for the shelf when processing the order task. Therefore, when an order task is processed, based on the demand of the order task for the items, it is necessary to consider not only the minimum number of transported shelves but also the processing timeliness of the order task, that is, it is necessary to distinguish among the shelves except the shelf pool of the current work station.

Compared with the minimum shelf collection method corresponding to the operation S1320, the dispersed selecting method corresponding to the operation S1330 specifically divides the shelves except the shelf pool of the current work station into the shelves that are not selected and the shelf pools of work stations other than the current work station. In addition, after considering the shelf pool of the current work station, the shelves including the items with no selected shelf in the order task among the shelves that are not selected are firstly considered, and then the shelf pools of work stations other than the current work station are considered. According to the above priority order, it is possible to avoid the phenomenon of waiting for order processing due to the repeated selections of the same shelf by different work stations, reduce the probability of selecting the shelves in the shelf pools of other work stations to complete the order task of the current work station, reduce the waiting time for the selected shelf when processing the order task, and thus improve the order processing timeliness.

In other words, when the required items in the order task are distributed dispersedly in the warehouse, the probability of repeatedly selecting the same shelf by different work stations is relatively small, and the use of the minimum shelf collection method can effectively improve the picking efficiency; when the required items in the order task are hot items in the warehouse and the distribution of the hot items is relatively concentrated, the use of the dispersed selecting method can reduce the cases where the order tasks of different work stations wait for the same shelf and improve the timeliness of processing the order tasks. In general, the selection of the minimum shelf collection method can efficiently complete the picking of the required items in the order task.

Exemplarily, the advantages of the dispersed selecting method over the minimum shelf collection method can be seen through the following examples.

The shelf A contains a total of x pieces of item S, the shelf B contains a total of x pieces of item S, and each of the work station W1 and work station W2 needs y pieces of such item, wherein the quantity relationship satisfies: x is greater than 2y.

Assuming that the operation times are as follows:

| | |
|---|---|
| T1 | Time for shelf A to go to work station W1 |
| T2 | Time for shelf B to go to work station W2 |
| P1 | Picking time of work station W1 |
| P2 | Picking time of work station W2 |
| M12 | Time of shelf from work station W1 to work station W2 |

If the selecting is made according to the minimum shelf collection method, both the work stations W1 and W2 may select the shelf A. Assuming that the shelf A firstly goes to the work station W1 for picking goods, the time for the work station W2 to complete the picking task is:

$$FW1=T1+P1+M12+P2.$$

In the case of dispersed selecting method, the work station W2 selects the shelf B when the work station W1 selects the shelf A. Here, considering that the shelf A has been selected by the work station W1 and the shelf A belongs to the shelf in the shelf pool of the work station W1, the work station W2 will select the shelf B according to the priority strategy of the shelves that are not selected and the shelf pools of other work stations. At this time, the time for the work station W2 to complete the picking task is:

$$FW2=T2+P2.$$

Normally, it can be assumed that T1 is approximately equal to T2, so T1+P1+M12>T2, that is, FW1>FW2. It can be seen that the dispersed selecting method can reduce the waiting time for processing the order task.

In an embodiment, the operation of selecting a shelf where items with no selected shelf are located successively in shelves that are not selected and shelf pools of work stations except the current work station according to the information of the items with no selected shelf in the order task, includes:

selecting a shelf where the type number of items with no selected shelf included exceeds a currently-set third threshold in the shelves that are not selected as a third target shelf in each shelf selecting process according to the information of the items with no selected shelf in the order task; or sorting shelves in the shelves that are not selected based on the type number of items with no selected shelf included on each shelf and selecting a third target shelf in terms of the sorting result in each shelf selecting process according to the information of the items with no selected shelf in the order task. For example, the sorting is performed in the order from large to small, and any of the top ones according to the sorting is selected as the third target shelf.

If there are still remaining items with no selected shelf in the order task after selecting the third target shelf, it is continued to select a fourth target shelf in shelf pools of work stations except the current work station, wherein the fourth target shelf is a shelf where the type number of remaining items with no selected shelf included exceeds a currently-set fourth threshold in each shelf selecting process, or a shelf determined based on shelf sorting in each shelf selecting process.

Here, the third threshold and the fourth threshold can be adaptively set and adjusted according to the picking requirement and the corresponding current shelf selecting rule. When the shelf where items with no selected shelf in the order task are located is selected successively in shelves that are not selected and the shelf pools of work stations except the current work station, it is possible to determine the information of the shelf where items with no selected shelf are located (e.g., the shelf number, and the number and types of the items with no selected shelf included on the shelf) according to the information of the items with no selected shelf, and then preferentially select the shelf with the most types of items with no selected shelf and the closest distance to the current work station through threshold comparison or shelf sorting, reducing the number of times the robots transport the shelves and lowering the transport cost of the shelves.

The technical solution of this embodiment considers the shelf pool of the current work station and the shelves except the shelf pool of the current work station successively according to the information of the items in the received order task, efficiently combines and selects the shelves where the items in the order task are located, and reduces the number of times the robots transport the shelves to the maximum extent; and on the other hand, specifically subdivides the shelves except the shelf pool of the current work station into the shelves that are not selected and the shelf pools of work stations other than the current work station, and selects the shelves successively in the priority sequence of the shelf pool of the current work station, the shelves that are not selected and the shelf pools of work stations other than the current work station, avoiding the phenomenon of affecting the processing timeliness of order tasks due to the repeated selections of the same shelf by different work stations. The embodiment of the present invention uses the above two selecting methods flexibly according to the distribution of the required items in the order task in the warehouse, solves the problem of low picking efficiency when the order tasks are issued in batches in the "goods-to-person" robot system, reduces the number of times the robot transports the shelves, reduces the probability of selecting the shelves in the shelf pools of other work stations to complete the order task of the current work station, and improves the picking efficiency and the order processing timeliness.

Figure 14:
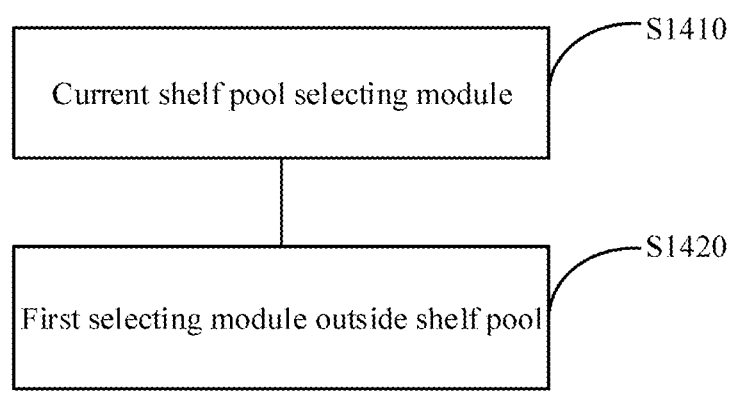
FIG. 14 is a structural schematic diagram of a shelf selecting apparatus provided by an embodiment of the present invention.

FIG. 14 is a structural schematic diagram of a shelf selecting apparatus provided by an embodiment of the present invention. This embodiment is applicable to the case of selecting a shelf according to an order task, and can also be used to implement the "task allocation unit" of the shelf transport device applied to the goods-to-person system in the above-mentioned embodiments. The shelf selecting apparatus provided in the embodiment of the present application can perform the shelf selecting method provided in any embodiment of the present application, and has the corresponding functional modules performing the method and beneficial effects thereof. As shown in FIG. 14, the device may include, for example, a current shelf pool selecting module 1410 and a first selecting module outside shelf pool 1420, wherein:

the current shelf pool selecting module 1410 is configured to: select a shelf where an item is located in a shelf pool of the current work station according to the information of the item in the received order task. In an embodiment, the current shelf pool selecting module 1410 includes a shelf pool information determining unit and a shelf pool selecting unit, wherein:

the shelf pool information determining unit is configured to: determine that the shelf pool of the current work station includes the information of the shelf of the required item according to the information of the item in the received order task;

the shelf pool selecting unit is configured to: select a shelf where the type number of required items included exceeds a currently-set first threshold as a first target shelf in each shelf selecting process according to the determined shelf information; or the shelf pool selecting unit is configured to: sort shelves based on the type number of required items included on each shelf and select a first target shelf in terms of the sorting result in each shelf selecting process according to the determined shelf information.

In an embodiment, the shelf pool selecting unit is further configured to:
  if the number of shelves where the type number of required items included exceeds the currently-set first threshold is greater than or equal to 2 in each shelf selecting process according to the determined shelf information, select a shelf that first entered the shelf pool of the current work station as the first target shelf according to a sequential order in which the shelves entered the shelf pool.

The first selecting module outside shelf pool 1420 is configured to: if the shelf selected in the shelf pool of the current work station cannot satisfy all items in the order task, continue to select a shelf where items with no selected shelf are located in shelves except the shelf pool of the current work station according to the information of the items with no selected shelf in the order task.

In an embodiment, the first selecting module outside shelf pool 1420 includes a first information determining unit and a second target shelf selecting unit, wherein:
  the first information determining unit is configured to: if the shelf selected in the shelf pool of the current work station cannot satisfy all items in the order task, determine the information of the shelf where items with no selected shelf are located in shelves except the shelf pool of the current work station according to the information of the items with no selected shelf in the order task;
  the second target shelf selecting unit is configured to: select a shelf where the type number of items with no selected shelf included exceeds a currently-set second threshold as a second target shelf in each shelf selecting process according to the information of the shelf where items with no selected shelf are located; or the second target shelf selecting unit is configured to: sort shelves based on the type number of items with no selected shelf included on each shelf and select a second target shelf in terms of the sorting result in each shelf selecting process according to the information of the shelf where items with no selected shelf are located.

In an embodiment, the second target shelf selecting unit is further configured to:
  if the number of shelves where the type number of items with no selected shelf included exceeds the currently-set second threshold is greater than or equal to 2 in each shelf selecting process according to the information of the shelf where items with no selected shelf are located, select a shelf of which the distance from the current work station does not exceed a distance threshold as the second target shelf.

In an embodiment, the apparatus further includes:
  a second selecting module outside shelf pool configured to: if the shelf selected in the shelf pool of the current work station cannot satisfy all items in the order task, select a shelf where items with no selected shelf are located successively in shelves that are not selected and shelf pools of work stations except the current work station according to the information of the items with no selected shelf in the order task, wherein the shelves that are not selected include shelves except shelf pools of all work stations in the warehouse.

In an embodiment, the second selecting module outside shelf pool includes a second information determining unit, a third target shelf selecting unit, and a fourth target shelf selecting unit, wherein:
  the second information determining unit is configured to: if the shelf selected in the shelf pool of the current work station cannot satisfy all items in the order task, determine information of a shelf where items with no selected shelf are located successively in the shelves that are not selected and shelf pools of work stations except the current work station according to the information of the items with no selected shelf in the order task;
  the third target shelf selecting unit is configured to: select a shelf where the type number of items with no selected shelf included exceeds a currently-set third threshold in the shelves that are not selected as a third target shelf in each shelf selecting process according to the information of the items with no selected shelf in the order task; or a third target shelf selecting unit configured to: sort shelves in the shelves that are not selected based on the type number of items with no selected shelf included on each shelf and select a third target shelf in terms of the sorting result in each shelf selecting process according to the information of the items with no selected shelf in the order task;
  the fourth target shelf selecting unit is configured to: if there are still remaining items with no selected shelf in the order task after selecting the third target shelf, continue to select a fourth target shelf according to the information of a shelf where the remaining items with no selected shelf are located determined in the shelf pools of work stations except the current work station, wherein the fourth target shelf is a shelf where the type number of remaining items with no selected shelf included exceeds a currently-set fourth threshold in each shelf selecting process, or a shelf determined based on shelf sorting in each shelf selecting process.

In the technical solution of this embodiment, the shelf where the item is located is preferentially selected in the shelf pool of the current work station according to the information of the item in the received order task; if the shelf selected in the shelf pool of the current work station cannot satisfy all the items in the order task, it is continued to select the shelf where the items with no selected shelf are located in shelves except the shelf pool of the current work station. Also, during the shelf selecting process, the shelf including more types of items in the order task is preferentially selected. The embodiments of the present invention solve the problem of low picking efficiency when the order tasks are issued in batches in the "goods-to-person" robot system, realize the efficient combination and selecting of the shelves where the items in the order tasks are located, reduce the number of times the robot transports the shelves, improve the picking efficiency and the order processing timeliness.

Figure 15:
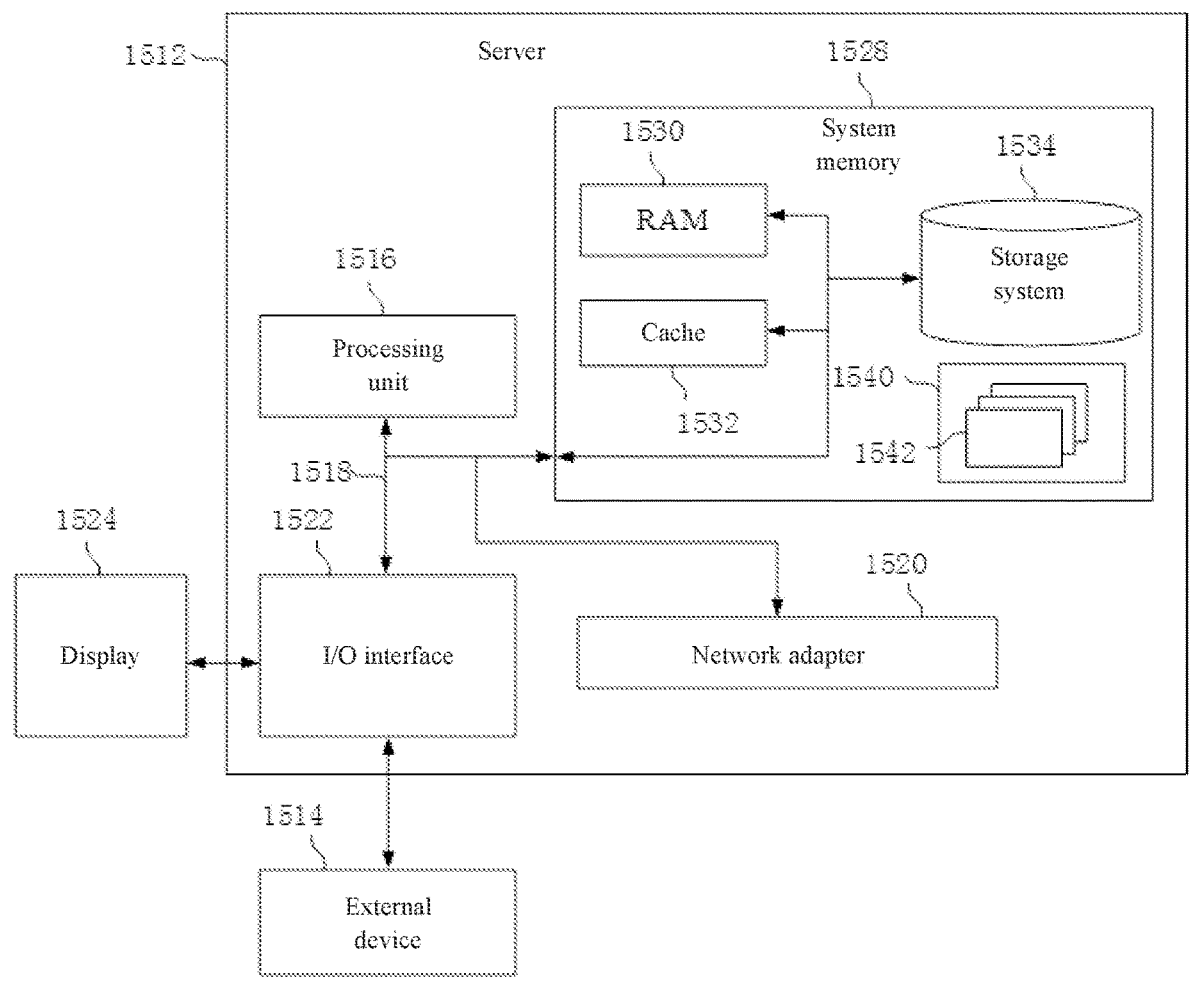
FIG. 15 is a structural schematic diagram of a server provided by an embodiment of the present invention.

FIG. 15 is a structural schematic diagram of a server provided by an embodiment of the present invention. FIG. 15 shows a block diagram of an exemplary server 1512 suitable for implementing the embodiments of the present invention. The server 1512 shown in FIG. 15 is only one example, and should not bring any limitation to the functions and usage scope of the embodiments of the present invention.

As shown in FIG. 15, the server 1512 is represented in the form of a general-purpose server. The components of the server 1512 may include but not limited to: one or more processors 1516, a storage device 1528, and a bus 1518 connecting different system components (including the storage device 1528 and the processor 1516).

The bus 1518 represents one or more of several types of bus structures, including a memory bus or a memory controller, a peripheral bus, a graphics acceleration port, a processor, or a local bus using any of multiple bus structures. For example, these architectures include but not limited to: Industry Subversive Alliance (ISA) bus, Micro Channel Architecture (MCA) bus, enhanced ISA bus, Video Electronics Standards Association (VESA) local bus, and Peripheral Component Interconnect (PCI) bus.

The server 1512 typically includes a variety of computer system readable media. These media can be any available media that can be accessed by the server 1512, including volatile and non-volatile media, removable and non-removable media.

The storage device 1528 may include a computer system readable medium in the form of volatile memory, such as a Random Access Memory (RAM) 1530 and/or a cache memory 1532. The server 1512 may include other removable/non-removable, volatile/nonvolatile computer system storage media. Merely as an example, the storage system 1534 may be used to read from and write to the non-removable and non-volatile magnetic media (not shown in FIG. 15, and commonly referred to as "hard drives"). Although not shown in FIG. 15, a magnetic disk drive for reading from and writing to a removable and non-volatile magnetic disk (such as "floppy disk") and an optical disk drive for reading from and writing to a removable and non-volatile optical disk (such as Compact Disc Read-Only Memory (CD-ROM), Digital Video Disc-Read Only Memory (DVD-ROM) or other optical media) may be provided. In these cases, each drive may be connected to the bus 1518 through one or more data medium interfaces. The storage device 1528 may include at least one program item that has a set of (for example, at least one) program modules configured to perform the functions of the embodiments of the present application.

A program/utility tool 1540 having a set of (at least one) program modules 1542 can be stored in, for example, the storage device 1528. Such program module 1542 includes but not limited to: operating system, one or more application programs, other program modules and program data. Each or a combination of these examples may include the realization of a network environment. The program module 1542 generally executes the functions and/or methods in the described embodiments of the present application.

The server 1512 may also communicate with one or more external devices 1514 (such as keyboard, pointing device, display 1524, etc.), and may also communicate with one or more devices that enable users to interact with the server 1512, and/or communicate with any device (e.g., network card, modem, etc.) that enables the server 1512 to communicate with one or more other computing devices. Such communication may be performed through an input/output (I/O) interface 1522. In addition, the server 1512 may also communicate with one or more networks (for example, Local Area Network (LAN), Wide Area Network (WAN) and/or public network such as Internet) through a network adapter 1520. As shown in FIG. 15, the network adapter 1520 communicates with other modules of the server 1512 through the bus 1518. It should be understood that, although not shown in figure, other hardware and/or software modules can be used in conjunction with the server 1512, including but not limited to: microcode, terminal driver, redundant processor, external disk drive array, Redundant Arrays of Independent Disks (RAID) system, tape drive, and data backup storage system, etc.

The processor 1516 executes various functional applications and data processing by running the programs stored in the storage device 1528, for example, to implement the shelf selecting method provided by the embodiments of the present invention, where this method includes:

selecting a shelf where an item is located in a shelf pool of a current work station according to the information of the item in a received order task;

if the shelf selected in the shelf pool of the current work station cannot satisfy all items in the order task, continuing to select a shelf where items with no selected shelf are located in shelves except the shelf pool of the current work station according to the information of the items with no selected shelf in the order task.

Alternatively, the processor 1516 executes various functional applications and data processing by running the programs stored in the storage device 1528, for example, to implement the shelf position adjustment method provided by the embodiments of the present invention, where this method includes:

determining shelf popularity levels and location popularity levels corresponding to at least some shelves in a warehouse according to a preset period, and saving them in a shelf information table;

when a location adjustment condition is generated, querying whether there is at least one candidate shelf in the shelf information table if a shelf popularity level of a current shelf is greater than a location popularity level corresponding to the current shelf; wherein a shelf popularity level corresponding to the candidate shelf is less than a location popularity level corresponding to the candidate shelf;

when at least one candidate shelf in the shelf information table is found, determining a target shelf that exchanges locations with the current shelf in the at least one candidate shelf;

controlling the robot to transport the current shelf to the location where the target shelf is located and transport the target shelf to the location where the current shelf is located.

An embodiment of the present invention further provides a computer-readable storage medium storing a computer program thereon, where the program, when executed by a processor, implements the shelf selecting method as provided by the embodiments of the present invention, and this method includes:

selecting a shelf where an item is located in a shelf pool of a current work station according to the information of the item in a received order task;

if the shelf selected in the shelf pool of the current work station cannot satisfy all items in the order task, continuing to select a shelf where items with no selected shelf are located in shelves except the shelf pool of the current work station according to the information of the items with no selected shelf in the order task.

Alternatively, the program, when executed by the processor, implements the shelf selecting method as provided by the embodiments of the present invention, and this method includes:

determining shelf popularity levels and location popularity levels corresponding to at least some shelves in a warehouse according to a preset period, and saving them in a shelf information table;

in response to that a location adjustment condition is generated, querying whether there is at least one candidate shelf in the shelf information table if a shelf popularity level of a current shelf is greater than a location popularity level corresponding to the current shelf; wherein a shelf popularity level corresponding to the candidate shelf is less than a location popularity level corresponding to the candidate shelf;

in response to that at least one candidate shelf in the shelf information table is found, determining a target shelf that exchanges locations with the current shelf in the at least one candidate shelf;

controlling the robot to transport the current shelf to the location where the target shelf is located and transport the target shelf to the location where the current shelf is located.

The computer storage media of the embodiment of the present invention may adopt any combination of one or more computer-readable media. The computer-readable medium may be a computer-readable signal medium or a computer-readable storage medium. The computer-readable storage medium may be, for example but not limited to, electrical, magnetic, optical, electromagnetic, infrared, or semiconductor system, apparatus or device, or any combination thereof. More specific examples of the computer-readable storage media (non-exhaustive list) include: electrical connection with one or more wires, portable computer disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof. In this document, the computer-readable storage medium can be any tangible medium that contains or stores a program, where the program can be used by or used in combination with the instruction execution system, apparatus or device.

The computer-readable signal medium may include data signals propagated in the baseband or as a part of carrier waves, and the computer-readable program codes are beared therein. Such propagated data signals can be in many forms, including but not limited to electromagnetic signals, optical signals, or any suitable combination thereof. The computer-readable signal medium may also be any computer-readable medium other than the computer-readable storage medium, and the computer-readable medium may send, propagate or transmit the programs used by or used in combination with the instruction execution system, apparatus or device.

The program codes contained on the computer-readable medium can be transmitted by any suitable medium, including but not limited to wireless, wire, optical cable, RF, etc., or any suitable combination thereof.

The computer program codes for performing the operations of the present application can be compiled in one or more programming languages or a combination thereof, where the programming languages include the object-oriented programming languages such as Java, Smalltalk, C++, and also include the conventional procedural programming languages such as "C" language or similar programming languages. The program codes can be executed entirely on a user computer, executed partly on a user computer, executed as an independent software package, executed partly on a user computer and partly on a remote computer, or executed entirely on a remote computer or terminal. In the case of a remote computer, the remote computer can be connected to the user computer through any kind of network including Local Area Network (LAN) or Wide Area Network (WAN), or can be connected to an external computer (for example, using the Internet service provider to connect via the Internet).

Figure 16:
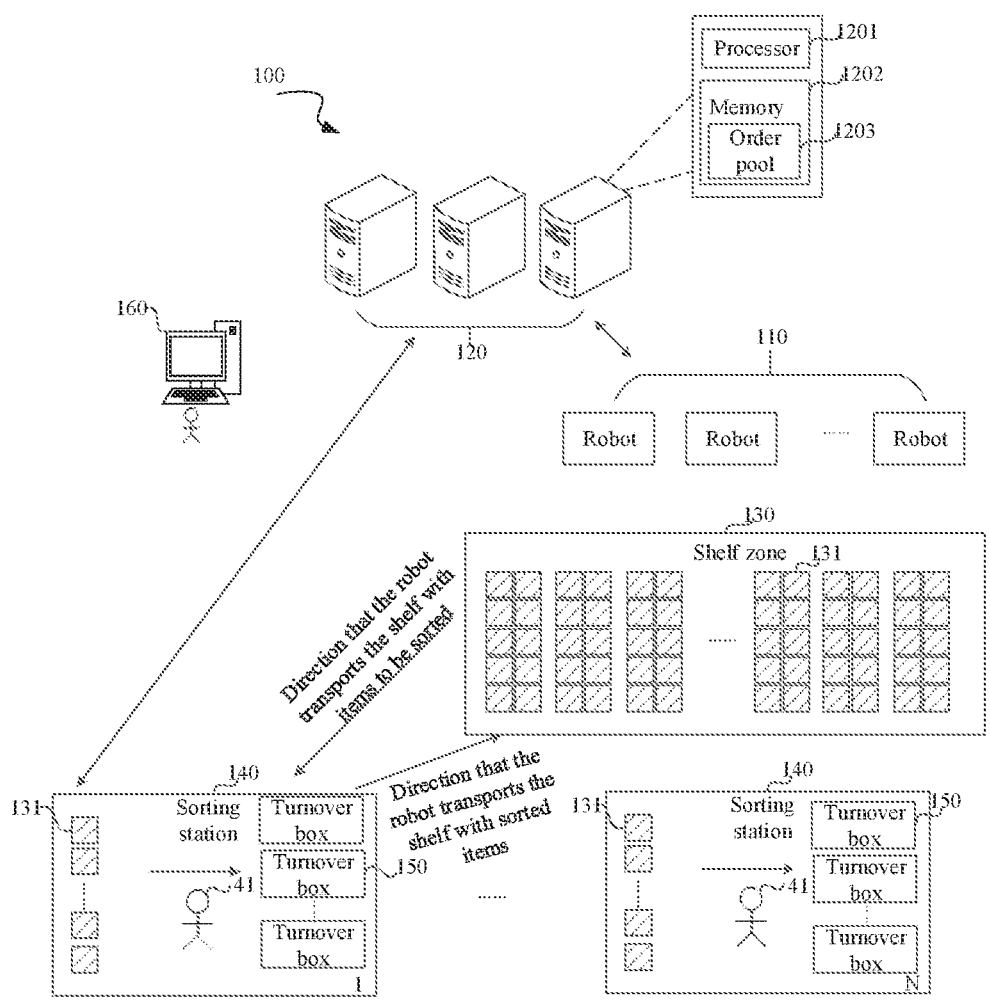
FIG. 16 is a schematic diagram of the system structure of a goods sorting system provided in an embodiment of the present invention.

FIG. 16 is a schematic diagram of the system structure of a goods sorting system provided in an embodiment of the present invention. Referring to FIG. 16, the goods sorting system 100 includes: self-driven robots 110, a control system 120, a shelf area 130 and a work station 140. The shelf area 130 is provided with multiple shelves 131 on which many kinds of goods are placed. For example, like the shelves with many kinds of goods we see in a supermarket, the shelves 131 are arranged in the form of a shelf array. Generally, a plurality of work stations 140 are provided on one side of the shelf area 130.

The control system 120 performs the wireless communications with the self-driven robots 110, the staff makes the control system 120 work through a console 160, and the self-driven robots 110 perform the cargo transport tasks under the control of the control system 120. For example, the self-driven robot 110 can travel along the empty space (a part of the passageway of the self-driven robot 110) in the shelf array, move below the target shelf 131, lift the target shelf 131 by the lifting mechanism, and transport it to the assigned work station 40. In one example, the self-driven robot 110 has a lifting mechanism and has the autonomous navigation function. The self-driven robot 110 can travel under the target shelf 131 and use the lifting mechanism to lift the entire shelf 131, so that the shelf 131 can move up and down along with the lifting mechanism with the lifting function. In one example, the self-driven robot 110 can drive forward according to the two-dimensional code information captured by the camera, and can drive under the shelf 131 prompted by the control system 120 according to the path determined by the control system 120. The self-driven robot 110 transports the target shelf 131 to the work station 140, where the picker 141 or the picking robot picks the goods from the shelf 131 and puts them in the turnover boxes 150 for packing.

The control system 120 is a software system that runs on a server and has the data storage and information processing capabilities, and can be connected to robots, hardware input system and other software systems in a wireless or wired way. The control system 120 may include one or more servers, and may be a centralized control architecture or a distributed computing architecture. The server has a processor 1201 and a memory 1202, and there may be an order pool 1203 in the memory 1202.

In the sorting system shown in FIG. 16, if a shelf is far away from the work station and the shelf is used frequently, then the shelf needs to be transported back and forth for a long distance in the process during which the self-driven robot 110 transports the shelf to the work station 140 for picking or loading, which will undoubtedly increase the transport time of the self-driven robot 110 for this shelf and reduce the transport efficiency of the shelf. However, if the shelf is fixedly placed in a certain position (for example, a position closer to the work station), the use frequency of any shelf is not fixed, where its use frequency may be very high during a certain period of time but may be reduced in another period of time, so it is necessary to dynamically adjust the positions of the shelves in the warehouse.

The shelf position adjustment method and related device provided in the embodiments of the present invention will be described below in detail by way of various embodiments.

Figure 17:
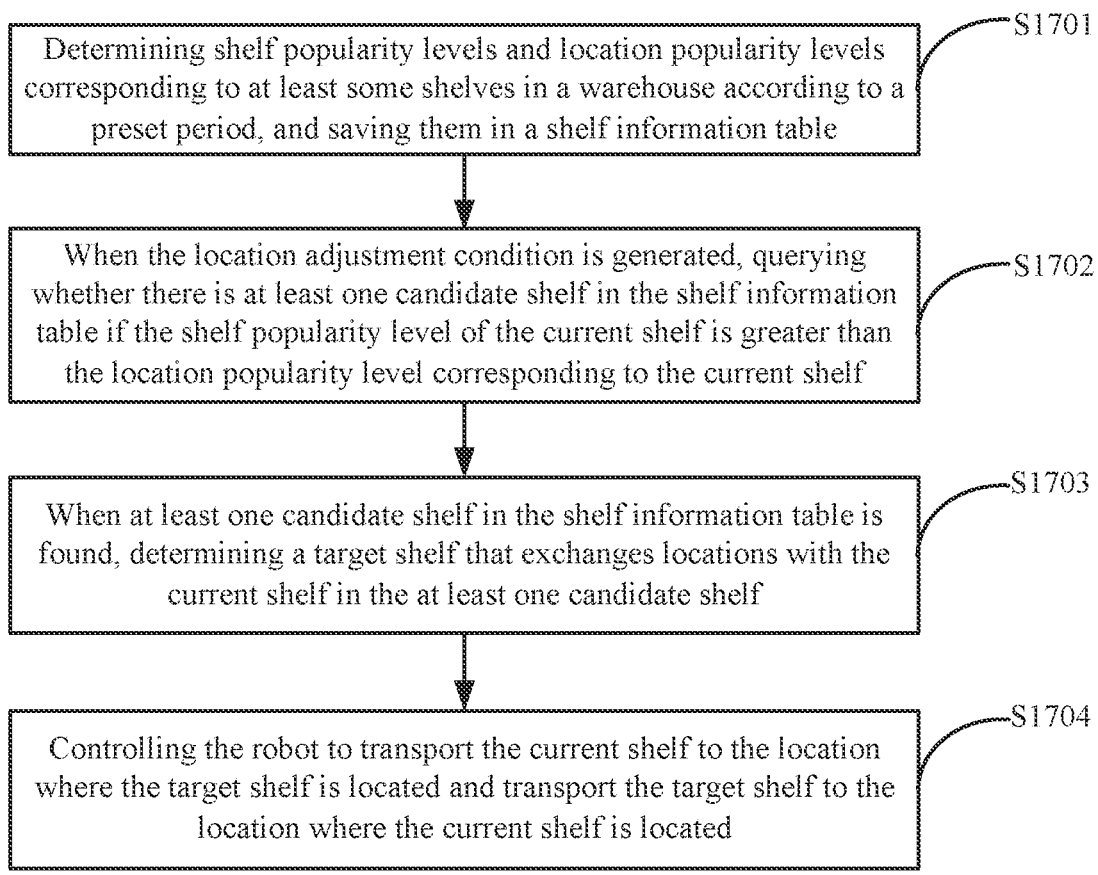
FIG. 17 is a schematic flowchart of a method for adjusting the shelf position provided in an embodiment of the present invention.

FIG. 17 is a schematic flow chart of a shelf position adjustment method provided in an embodiment of the present invention. The embodiment of the present invention can be applied to the case of adjusting shelves in real time in a warehouse, and the method can be executed by a shelf position adjustment device which can be realized by software and/or hardware. This device can be integrated in any computer equipment of the shelf position adjustment system with network communication function, where the computer equipment can be a server for completing the shelf position adjustment, or a computer equipment such as computer, etc.

As shown in FIG. 17, the shelf position adjustment method in the embodiment of the present invention may include: operation 1701 to operation 1704.

Operation 1701: determining shelf popularity levels and location popularity levels corresponding to at least some shelves in a warehouse according to a preset period, and saving them in a shelf information table.

In an embodiment of the present invention, the preset period may be a preset time interval or a preset time point. The preset time interval or the preset time point may be a static value set for at least some shelves located in the warehouse, or may be a dynamic value set for the states of at least some shelves located in the warehouse. For example, the preset time interval may be half an hour, one hour or longer, and the preset time point may be a fixed time point (8 o'clock, 9 o'clock, or 12 o'clock). In an embodiment, the at least some shelves located in the warehouse may have some shelves of which the use frequency is particularly high. At this time, a dynamically-changed preset period can be set according to the use states of these shelves.

In addition, since the data processing capabilities of the servers or computer devices used to adjust shelf positions may be different, the preset period may be adjusted appropriately according to the data processing capability of the server or computer device used to adjust shelf positions in one embodiment. For example, when the data processing capacity of the server or computer equipment is large, the preset period can be appropriately adjusted to be smaller, so that the shelf popularity levels and location popularity levels corresponding to at least some shelves in the warehouse can be determined in a more timely manner, and thus the shelf positions can be subsequently adjusted in real time; and when the data processing capacity of the server or computer equipment is small, the preset period setting can be adjusted appropriately to be larger. The advantage of such setting is that not only the shelf popularity levels and location popularity levels corresponding to at least some shelves in the warehouse can be determined flexibly according to the preset period and stored in the shelf information table, but also the data processing capacity of the server or computer equipment can be fully and reasonably used. Of course, the embodiments of the present invention does not specifically limit the preset period setting.

In an embodiment of the present invention, the use frequency of each shelf in the warehouse is not fixed, where the use frequency of certain shelves may be very high in a certain period of time but may be very low in another period of time, so it is necessary to dynamically adjust the positions of the shelves in the warehouse so that the shelves that are used frequently in the warehouse can reach the work station in the warehouse with the shorter time and shorter distance. Each shelf in the warehouse can be matched with a corresponding shelf popularity level and location popularity level. The shelf popularity level can be used to indicate the shelf usage frequency. When the shelf usage frequency is higher, the shelf popularity level corresponding to the shelf is greater; and when the shelf usage frequency is lower, the shelf popularity level corresponding to the shelf is smaller. For example, when a shelf is frequently used for a certain period of time, that is, the shelf needs to be frequently transported to a work station located in the warehouse for picking or loading in a certain period of time, it indicates that the usage frequency of the shelf in this period of time is very high.

In an embodiment of the present invention, the location popularity level can be determined according to the distance between the placement location of the shelf and the work station, which can be used to indicate the superiority of the placement location of the shelf in the warehouse. When the placement location of a shelf is closer to various work stations in the warehouse, it is more convenient to transport the shelf from the placement location of the shelf to a work station, so that the transport time of the shelf is shorter and the transport efficiency is higher during each transportation, indicating at this time that the superiority of the placement location of the shelf is higher; on the contrary, when the placement location of a shelf is farther from various work stations in the warehouse, it is less convenient to transport the shelf from the placement location of the shelf to a work station, so that the transport time of the shelf is longer and the transport efficiency is lower during each transportation, indicating at this time that the superiority of the placement location of the shelf is lower.

In an embodiment of the present invention, there may also be some shelves of which the use frequency is relatively stable (neither high nor low) in the shelves in the warehouse. For such shelves, there may be no need to adjust positions frequently. Thus, when the positions of the shelves in the warehouse are adjusted, the real-time position adjustment may be performed for at least a part of the shelves in the warehouse, for example, for such shelves of which the use frequency may be very high in a certain period of time but may be very low in another period of time. At this time, the shelf popularity levels and location popularity levels corresponding to at least some shelves in the warehouse can be determined according to the preset period and stored in the shelf information table, so that which shelves need the position adjustment can be subsequently determined according to the shelf popularity levels and location popularity levels corresponding to the shelves in the shelf information table. It should be noted that, if it is impossible to accurately judge which shelves in the warehouse have the stable usage frequency, the shelf popularity levels and location popularity levels corresponding to all the shelves in the warehouse can be determined according to the preset period and stored in the shelf information table.

Operation 1702: when the location adjustment condition is generated, querying whether there is at least one candidate shelf in the shelf information table if the shelf popularity level of the current shelf is greater than the location popularity level corresponding to the current shelf.

Here, the shelf popularity level corresponding to the candidate shelf is less than the location popularity level corresponding to the candidate shelf.

In an embodiment of the present invention, the shelf information table stores the real-time shelf information of at least some shelves in the warehouse, and the shelf information of each shelf stored in the shelf information table can be updated in real time according to the preset period. The shelf information table may include: shelf names of at least some or all of the shelves in the warehouse, and shelf popularity levels and location popularity levels corresponding to at least some or all of the shelves in the warehouse. Each shelf in the warehouse can be matched with a corresponding shelf popularity level and location popularity level, wherein the shelf popularity level corresponding to a shelf is related to the shelf itself, while the location popularity level corresponding to a shelf is related to the location where the shelf is located. In other words, when the location where the shelf is located changes, the location popularity level corresponding to the shelf also changes accordingly.

In addition, the shelf popularity level is greater than the location popularity level, which can be understood as: the usage frequency of the shelf is very high but the location where the shelf is located is not superior, that is, far away from the work station, so that the shelf does not match with the location where the shelf is located, causing the very long time and distance each time the shelf is transported to the work station, and resulting in the very low transport efficiency. On the contrary, the shelf popularity level is less than the location popularity level, which can be understood as: the usage frequency of the shelf is relatively low but the location where the shelf is located is very superior, that is, relatively close to the work station. At this time, the shelf occupies the superior shelf position, resulting in the waste of location resources.

In an embodiment of the present invention, when the position adjustment condition is generated, the shelf position adjustment device can query the shelf popularity level of the current shelf and the location popularity level corresponding to the current shelf in the shelf information table, and judge whether the shelf popularity level of the current shelf is greater than the location popularity level corresponding to the current shelf according to the query result. If the shelf popularity level of the current shelf is greater than the location popularity level corresponding to the current shelf, the traversal query is performed in the shelf information table to query whether there is at least one candidate shelf in the shelf information table. In the shelf information table, the shelf popularity level corresponding to the candidate shelf is less than the location popularity level corresponding to the candidate shelf. If the shelf popularity level of the current shelf is less than the location popularity level corresponding to the current shelf, the subsequent operations are stopped, and there is no need to query whether there is at least one candidate shelf in the shelf information table.

In an embodiment of the present invention, any one of at least some shelves in the warehouse may be used as the current shelf. Of course, the determination of the current shelf from the warehouse also needs to meet the corresponding location adjustment condition. When any shelf in the warehouse meets the position adjustment condition, the shelf meeting the location adjustment condition can be used as the current shelf In an embodiment, the location adjustment condition may include: before a shelf needs to be returned from a location of any work station in the warehouse to a location of the shelf, or when a shelf is idle. Exemplarily, for the first location adjustment condition, any shelf located in the warehouse can be in the shelf-transport use state. At this time, the robot transports out any shelf in the warehouse from the position of the shelf and transports it to a work station located in the warehouse. Before the shelf in the transport use state needs to be returned from the position of any work station in the warehouse to the initial position of the shelf, the shelf that is currently in the transport use state can be used as the current shelf to performing the subsequent related operations. For the second location adjustment condition, when at least some shelves in the warehouse may be in the shelf idle state, the at least some shelves in the warehouse have not been moved out of their positions by the robot for use, and then any one of these shelves in the idle state is used as the current shelf to perform the subsequent related operations of position adjustment.

It should be noted that the shelf position adjustment device can use one or more shelves in the warehouse as the current shelf(shelves) and adjust the position(s) thereof. In other words, multiple shelves can be adjusted in parallel. In an embodiment of the present invention, the process of adjusting the position of one current shelf is selected for clear explanation, and the position adjustment of other current shelves is the same as the position adjustment of one current shelf in the embodiment of the present invention.

Operation 1703: when at least one candidate shelf in the shelf information table is found, determining a target shelf that exchanges locations with the current shelf in the at least one candidate shelf.

In an embodiment of the present invention, among various shelves stored in the shelf information table, there may be cases where the shelf popularity level corresponding to the shelf is greater than the location popularity level corresponding to the shelf, or there may be cases where the shelf popularity level corresponding to the shelf is less than the location popularity level corresponding to the shelf. When it is queried from the shelf information table that there are at least one candidate shelf of which the shelf popularity level is less than the location popularity level, one shelf is selected from the at least one candidate shelf as the target shelf that exchanges locations with the current shelf. When it is queried from the shelf information table that there is no candidate shelf satisfying that the shelf popularity level corresponding to the shelf is less than the location popularity level corresponding to the shelf, there is no need to perform the subsequent operations related to adjusting the position of the current shelf. It should be noted that the target shelf may be a kind of reference, and may refer to a shelf that satisfies the position interchange adjustment with the current shelf.

Operation 1704: controlling the robot to transport the current shelf to the location where the target shelf is located and transport the target shelf to the location where the current shelf is located.

In an embodiment of the present invention, each shelf in the warehouse needs to be placed in its respective placement position, that is, placed at the position where the shelf is located. If the current shelf does not undergo any position adjustment, then the moved-out current shelf needs to be returned to the original placement position every time after the current shelf is moved out of the placement position to the work station for use. If the current shelf needs the position adjustment and after the target shelf is determined, the shelf position adjustment device can control the robot to transport the current shelf to the initial position where the target shelf is located, and transport the target shelf to the initial position where the current shelf is located at the same time. It should be noted that the location popularity level corresponding to the shelf will also change as the position of the shelf changes if the position of the shelf is adjusted.

In one embodiment, when controlling the robot to transport the current shelf to the location where the target shelf is located and transport the target shelf to the location where the current shelf is located, it is also possible to exchange the location information of the location where the current shelf is located with the location information of the location where the target shelf is located, wherein the location information may be the position where the shelf is placed in the warehouse. Exemplarily, after the location exchange is completed, the location information of the current shelf A is changed to the location information of the target shelf B before the location exchange, while the location information of the target shelf B is changed to the location information of the current shelf A before the position exchange.

In one embodiment, when controlling the robot to transport the current shelf to the location where the target shelf is located and transport the target shelf to the location where the current shelf is located, it is also possible to exchange the location popularity level corresponding to the current shelf with the location popularity level of the target shelf. Exemplarily, after the location exchange is completed, the location popularity level of the current shelf A is set to the location popularity level of the target shelf B before the location exchange, while the location popularity level of the target shelf B is set to the location popularity level of the current shelf A before the location exchange. It should be noted that the shelf popularity levels of the shelves do not change after the locations of the current shelf and target shelf are adjusted. The shelf popularity level is related to the shelf itself. The determination of the shelf popularity level and location popularity level will be illustrated later in detail.

In one embodiment, in the process of transporting the current shelf to the location of the target shelf, before the current shelf is transported to the location of the target shelf by controlling the robot, it can be judged whether the target shelf is still at the location where the target shelf is located and has not been moved out. If the target shelf is not at the location where the target shelf is located, the current shelf is directly transported to the location where the target shelf is located. If the target shelf is at the location where the target shelf is located and has not been transported, another robot is controlled to transport the target shelf from the location where the target shelf is located to the initial location where the current shelf is located, and then the robot is controlled to transport the current shelf to the initial location where the target shelf is located, to thereby complete the location exchange.

In one embodiment, in the process of transporting the current shelf to the location where the target shelf is located, if there is a shelf of which the position needs to be adjusted by a third party, then the best adjusting method can be determined among the current shelf, the target shelf and the shelf of which the position needs to be adjusted by the third party, and the positions of the current shelf, the target shelf and the shelf of which the position needs to be adjusted by the third party are adjusted. For example, the current shelf A is transported to the original location of the target shelf B, the target shelf B is transported to the original location of the shelf C of which the position needs to be adjusted by the third party, and the shelf C of which the position needs to be adjusted by the third party is transported to the original location of the current shelf A. Of course, the adjustment methods can be combined according to the actual situation of shelves, which will not be specifically explained here.

In the technical solution of the embodiment of the present invention, the shelf popularity levels and location popularity levels corresponding to at least some shelves in the warehouse are determined according to the preset period and saved in a shelf information table; when the location adjustment condition is generated, it is queried whether there is at least one candidate shelf in the shelf information table if the shelf popularity level of the current shelf is greater than the location popularity level corresponding to the current shelf; wherein the shelf popularity level corresponding to the candidate shelf is less than the location popularity level corresponding to the candidate shelf; the target shelf that exchanges locations with the current shelf is determined in the at least one candidate shelf when at least one candidate shelf is queried in the shelf information table; and the robot is controlled to transport the current shelf to the location where the target shelf is located and transport the target shelf to the location where the current shelf is located. The embodiment of the present invention solves the problems of long transport distance, long transport time and low picking efficiency of the current shelf in the process of transporting the current shelf to the work station by the robot, reduces the movement distance of the robot, reduces the number of times of shelf transports, shortens the transport time, and improves the picking efficiency.

Figure 18:
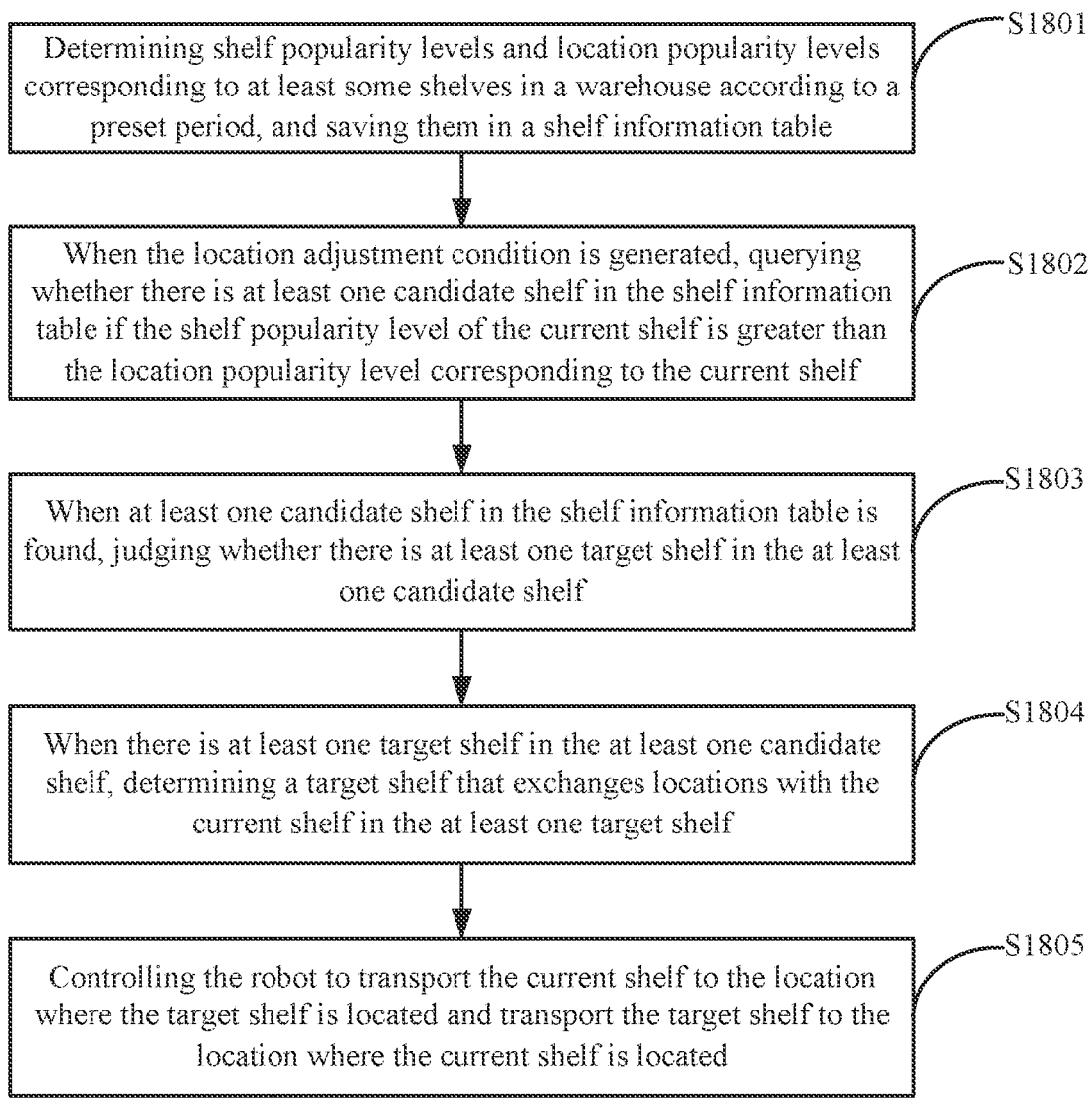
FIG. 18 is a schematic flowchart of a method for adjusting the shelf position provided in an embodiment of the present invention.

FIG. 18 is a schematic flowchart of a shelf position adjustment method provided in the second embodiment of the present invention. This embodiment of the present invention is further optimized on the basis of the foregoing embodiments.

As shown in FIG. 18, the shelf position adjustment method in the embodiment of the present invention may include: operation 1801 to operation 1805.

Operation 1801: determining shelf popularity levels and location popularity levels corresponding to at least some shelves in a warehouse according to a preset period, and saving them in a shelf information table.

Operation 1802: when the location adjustment condition is generated, querying whether there is at least one candidate shelf in the shelf information table if the shelf popularity level of the current shelf is greater than the location popularity level corresponding to the current shelf.

Here, the shelf popularity level corresponding to the candidate shelf is less than the location popularity level corresponding to the candidate shelf.

In one embodiment, the location adjustment condition triggering whether to subsequently judge the shelf popularity level and location popularity level may include: before a shelf needs to be returned from a location of any work station in the warehouse to a location of the shelf, or when a shelf is idle.

Operation 1803: when at least one candidate shelf in the shelf information table is found, judging whether there is at least one target shelf in the at least one candidate shelf.

Here, the location popularity level corresponding to the target shelf is greater than the location popularity level corresponding to the current shelf, and the shelf popularity level corresponding to the target shelf is less than the shelf popularity level corresponding to the current shelf.

In an embodiment of the present invention, among the candidate shelves obtained by the query, although the shelf popularity level corresponding to the candidate shelf is less than the location popularity level corresponding to the candidate shelf, the location popularity level corresponding to the candidate shelf may be less than the location popularity level corresponding to the current shelf. At this time, the location popularity level corresponding to the candidate shelf still cannot match the shelf popularity level corresponding to the current shelf. To this end, when at least one candidate shelf is queried from the shelf information table, the shelf position adjustment device can judge the relationship of size between the location popularity level corresponding to each of the at least one candidate shelf obtained by the query and the location popularity level corresponding to the current shelf, and the relationship of size between the shelf popularity level corresponding to each candidate shelf and the shelf popularity level corresponding to the current shelf. If it is determined that the location popularity level corresponding to a candidate shelf in the candidate shelves is greater than the location popularity level corresponding to the current shelf, and the shelf popularity level corresponding to the candidate shelf is less than the shelf popularity level corresponding to the current shelf, it is determined that there is at least one target shelf in the candidate shelves. If it is determined that there is no candidate shelf in candidate shelves of which the location popularity level is greater than the location popularity level corresponding to the current shelf, and the shelf popularity level corresponding to the candidate shelf is less than the shelf popularity level corresponding to the current shelf, then it is determined that there is no target shelf in the candidate shelves, and the subsequent operations related to adjusting the position of the current shelf is stopped.

Operation 1804: when there is at least one target shelf in the at least one candidate shelf, determining a target shelf that exchanges locations with the current shelf in the at least one target shelf.

In an embodiment of the present invention, if it is determined that there is at least one target shelf in the at least one candidate shelf, the at least one target shelf determined is traversed in the shelf information table, and a target shelf that exchanges locations with the current shelf is searched from the at least one target shelf. The shelf position adjustment device may determine one or more target shelves. If there are multiple target shelves, since the shelf popularity levels corresponding to the target shelves may be all the same or partly the same, and correspondingly the location popularity levels corresponding to the target shelves may be all the same or partly the same, it is necessary to select the best target shelf from a large number of target shelves as the target shelf that exchanges positions with the current shelf.

In an embodiment, the target shelf with the highest location popularity level can be selected from at least one target shelf according to the magnitude of location popularity level as the target shelf that will eventually exchange positions with the current shelf. For example, the target shelves may be sorted in the descending order of location popularity level, and the target shelf that is sorted in the first is determined according to the sorting result as the target shelf that will eventually exchange positions with the current shelf. In an embodiment, the target shelf with the lowest shelf popularity level can be selected from at least one target shelf according to the magnitude of shelf popularity level as the target shelf that will eventually exchange positions with the current shelf. For example, the target shelves may be sorted in the descending order of shelf popularity level, and the target shelf that is sorted in the last is determined according to the sorting result as the target shelf that will eventually exchange positions with the current shelf. In an embodiment, the target shelf with the highest location popularity level and the lowest shelf popularity level may be selected from at least one target shelf as the target shelf that will eventually exchange positions with the current shelf.

In an embodiment, there may be multiple target shelves with the highest location popularity level and the lowest shelf popularity level selected from at least one target shelf. In this case, based on the determined far-near degrees between the positions of multiple target shelves with the highest location popularity level and the lowest shelf popularity level and the position of the current shelf, the target shelf with the highest location popularity level and the lowest shelf popularity level that has the nearest distance may be determined as the target shelf that will eventually exchange positions with the current shelf.

Operation 1805: controlling the robot to transport the current shelf to the location where the target shelf is located and transport the target shelf to the location where the current shelf is located.

In the technical solution of the embodiment of the present invention, the shelf popularity levels and location popularity levels corresponding to at least some shelves in the warehouse are determined according to the preset period and saved in a shelf information table; when the location adjustment condition is generated, it is queried whether there is at least one candidate shelf in the shelf information table if the shelf popularity level of the current shelf is greater than the location popularity level corresponding to the current shelf; wherein the shelf popularity level corresponding to the candidate shelf is less than the location popularity level corresponding to the candidate shelf; then it is judged whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf; the target shelf that exchanges locations with the current shelf is determined in the at least one target shelf when there is at least one target shelf in the at least one candidate shelf; and the robot is controlled to transport the current shelf to the location where the target shelf is located and transport the target shelf to the location where the current shelf is located. The embodiment of the present invention can determine the optimal adjustment method that meets the conditions during the shelf position adjustment process, solves the problems of long transport distance, long transport time and low picking efficiency of the current shelf in the process of transporting the current shelf to the work station by the robot, reduces the movement distance of the robot, reduces the number of times of shelf transports, shortens the transport time, and improves the picking efficiency.

Figure 19:
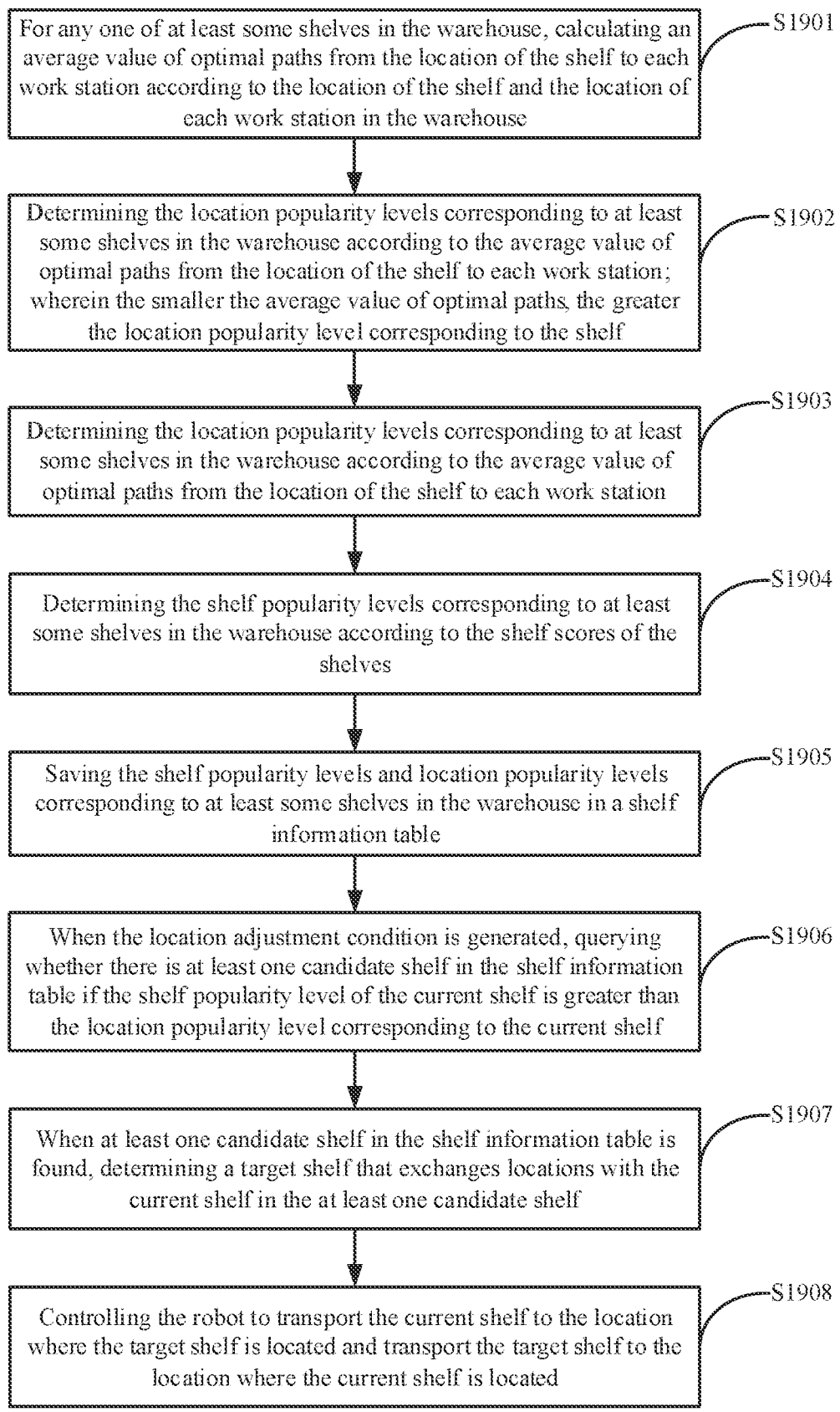
FIG. 19 is a schematic flowchart of a method for adjusting the shelf position provided in an embodiment of the present invention.

FIG. 19 is a schematic flowchart of a shelf position adjustment method provided in an embodiment of the present invention. This embodiment of the present invention is further optimized on the basis of the foregoing embodiments.

As shown in FIG. 19, the shelf position adjustment method in the embodiment of the present invention may include: operation 1901 to operation 1908.

Operation 1901: for any one of at least some shelves in the warehouse, calculating an average value of optimal paths from the location of the shelf to each work station according to the location of the shelf and the location of each work station in the warehouse.

Figure 20:
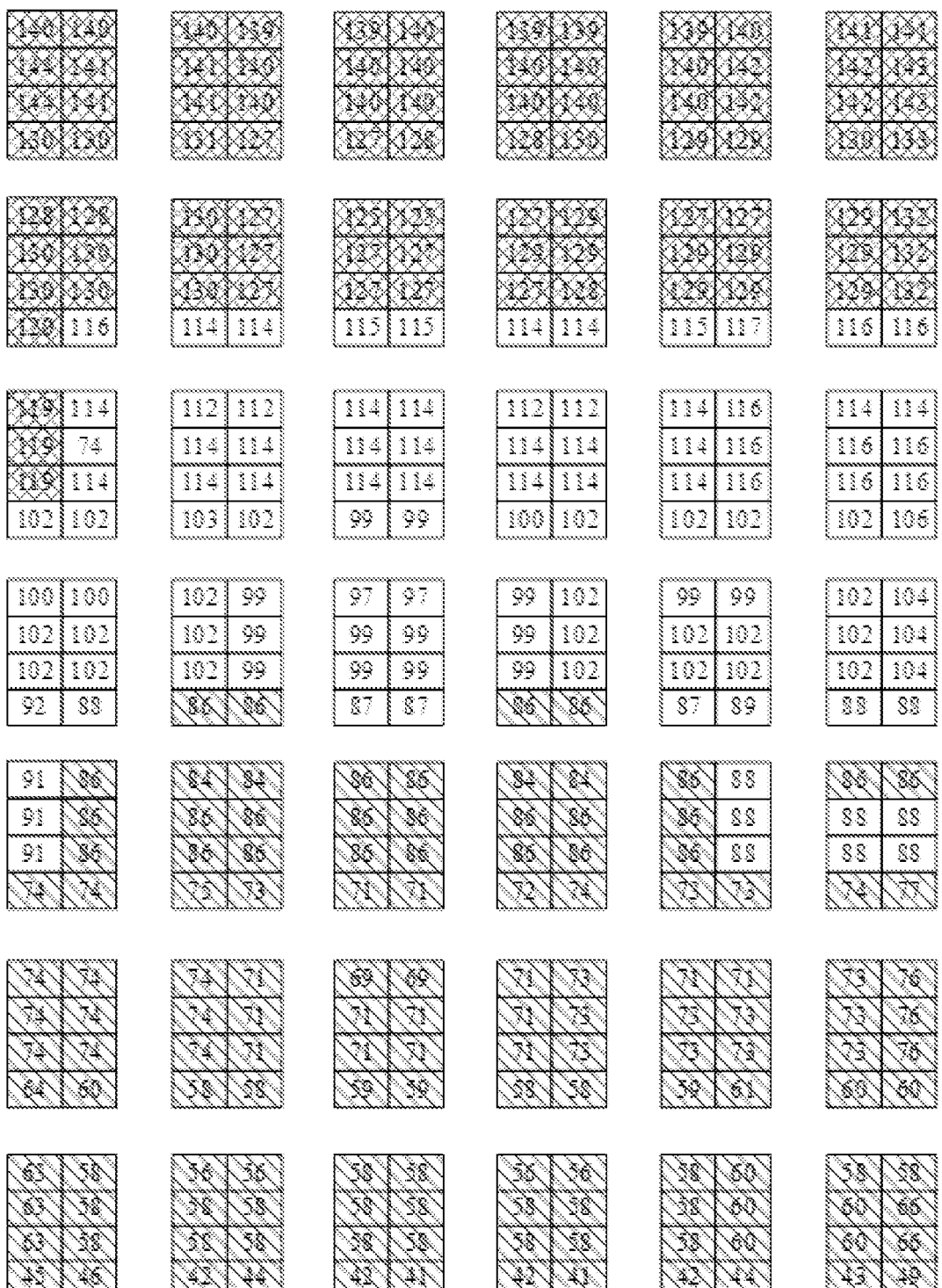
FIG. 20 is a schematic diagram of the arrangement of positions of work stations and shelves in a warehouse provided in an embodiment of the present invention.

In an embodiment of the present invention, FIG. 20 is a schematic diagram of the arrangement of positions of work stations and shelves in a warehouse provided in an embodiment of the present invention. Referring to FIG. 20, the locations of shelves in the warehouse and work stations in the warehouse can be arranged according to the preset rule, and the locations of shelves and the location information of each work station are recorded, wherein the location information can be understood as the location of each shelf and the location information of each work station in the warehouse. For example, the location information may include the location of each shelf, the serial number of each work station in the warehouse, and the path relationship between the location of each shelf and each work station in the warehouse. After determining the location of each shelf and the location of each work station, the average value of optimal paths from the location of the shelf to each work station can be calculated according to the location of the shelf and the location of each work station in the warehouse.

In an embodiment of the present invention, the shelf position adjustment device can determine each optimal path from the location of any shelf to each work station according to the location of the placement platform corresponding to each shelf and the location of each work station, and then calculate the average value of the optimal paths from the location of the shelf to each work station according to the optimal path to each work station. Exemplarily, there may be more than one work station in the warehouse, and may be multiple. In view of the above situation, the distances from the location of any shelf to the work stations are different, and the path from the location of any shelf to any work station is also different. There may be multiple paths from the location of any shelf to any work station. In one embodiment, the A* search algorithm can be used to search for each optimal path from the location of any shelf to the location of each work station respectively according to the location of any shelf and the location of each work station, and then the average value of the optimal paths from the location of the shelf to each work station is calculated according to the optimal path to each work station, so that the average value of the optimal paths between any other shelf and each work station can be calculated in turn according to the above method.

Operation 1902: determining the location popularity levels corresponding to at least some shelves in the warehouse according to the average value of optimal paths from the location of the shelf to each work station.

Here, the smaller the average value of optimal paths, the greater the location popularity level corresponding to the shelf.

In an embodiment of the present invention, the positions of shelves can be sorted according to the average values of the optimal paths from the positions of the shelves to each work station in ascending order. According to the result of sorting the positions of shelves, the positions of shelves are divided into different popularity zones, where each popularity zone can be configured with a corresponding popularity level. When the average value of the optimal paths from the location of the shelf to each work station is smaller, the popularity level of the location is greater, and when the average value of the optimal paths from the location of the shelf to each work station is greater, the popularity level of the location is smaller. The location popularity levels of shelves in the warehouse match with the popularity levels of locations where the shelves are located one by one. In other words, the popularity level of the location where each shelf is located can be configured on each shelf to become the location popularity level corresponding to each shelf in the warehouse. It should be noted that, in the same popularity zone, the average value of the optimal paths from the location of the shelf to each work station may not be a fixed value, but a range. In other words, although the average values of optimal paths from the locations of different shelves to each work station may be different, the locations of the shelves with different average values of optimal paths may be in the same popularity zone. Of course, there can be only one average value of optimal paths in the same popularity zone. The specific setting can be set according to the actual situation. For example, the reference popularity value is set for the location of each shelf according to the average value of optimal paths, and the reference popularity value is assigned to each shelf as the location popularity level corresponding to each shelf. At this time, the location popularity level can directly be the location popularity value.

Exemplarily, referring to FIG. 19, the positions of some shelves and some work stations in the warehouse among the positions of shelves and work stations in the warehouse are shown. FIG. 19 includes three work stations. Above the work stations, each shelf is placed at the location of each shelf, and the location of each shelf is marked with the average value of optimal paths of each shelf from the location of each shelf to each work station, where the average value of optimal paths from the location of the shelf close to work stations to each work station is relatively small, and the average value of optimal paths from the location of the shelf far from work stations to each work station is relatively large. According to the previous explanation, the larger the average value of optimal paths from the location of each shelf to each work station, the lower the popularity level of the location where the shelf is located; and the smaller the average value of optimal paths from the location of each shelf to each work station, the higher the popularity level of the location where the shelf is located. In FIG. 19, the locations of shelves in the warehouse are divided into three popularity zones according to the average value of optimal paths, which are represented by different marking lines, where the largest popularity level is indicated by oblique lines on the placement platform represented by small rectangular grids, the second-ranked popularity level is indicated by blank space on the placement platform represented by small rectangular grids, and the smallest popularity level is indicated by cross lines on the placement platform represented by small rectangular grids. Referring to FIG. 19, it can be seen that there are different average values of optimal paths in the same popularity zone, that is, the positions of shelves are sequentially divided into different popularity zones through a range of the average values of optimal paths. It should be noted that the above-mentioned popularity partition in FIG. 19 is only an example, and it is preferable to refine each placement platform into more popularity zones.

Operation 1903: for any one of at least some shelves in the warehouse, calculating a shelf score of the shelf according to a sales impact factor corresponding to the shelf.

In an embodiment of the present invention, the sales impact factor can be understood as the sales impact factor of the item on the shelf. The sales impact factor can be used to score at least some or all of the shelves in the warehouse to determine the shelf score of each shelf. The shelf score can reflect the use frequency of the shelf in a certain period of time, wherein the larger the shelf score, indicating that the greater the sales of items on the shelf, the greater the use frequency of the shelf; on the contrary, the smaller the shelf score, indicating that the less the sales of items on the shelf, the smaller the use frequency of the shelf.

In an optional implementation provided in an embodiment of the present invention, the operation of calculating a shelf score of the shelf according to a sales impact factor corresponding to the shelf may include:

calculating predicted sales volume of items on the shelf according to sales volume impact factors corresponding to the items on the shelf and weights corresponding to the sales volume impact factors; wherein the sales volume impact factors include at least one of: order pool factor, historical sales volume factor, historical stacking factor, inventory factor and designated sales volume factor;

calculating the shelf score of the shelf according to the predicted sales volume of items on the shelf, the total inventory of the warehouse, and the number of items on the shelf.

In this embodiment, the order pool factor can be understood as an item order pre-stored in the warehouse within a certain period of time, that is, the items to which the order in the order pool belongs have been ordered by the merchant, the warehouse has received the order for the items, and this item order has been placed in the order pool, but the items have not been sent to the merchant. The historical sales volume factor can be understood as the sales volume of a certain item in a certain period of time in history. The historical stacking factor can be understood as the types and quantity of items stored in advance during some holidays or during big sale events. The inventory factor can be understood as the types, quantity and backlog time, etc. of items backlogged in the warehouse. The designated sales volume factor can be understood as the types and quantity of items ordered by the merchant at the designated time as needed.

In this embodiment, the predicted sales volume of items on the shelf is calculated according to sales volume impact factors corresponding to the items on the shelf and weights corresponding to the sales volume impact factors. The formula for calculating the predicted sales volume of items that can be used is: predicted sales volume of items=(order pool factor*weight)+(historical sales volume factor*weight)+(historical shelf factor*weight)+(inventory factor*weight)+(designated sales volume factor*weight). It should be noted that the weight of the order pool factor is generally relatively large, the weight of the historical sales volume factor needs to be comprehensively considered based on the sales situation of each time period in the history, and the weight of the designated sales volume factor can be determined by manual intervention during the item sales time. In addition, the weights of the aforementioned order pool factor, historical sales volume factor, historical stacking factor, inventory factor and designated sales volume factor are not the only ones that can be set and adjusted manually according to the actual sales situation of items on the shelf In one embodiment, the operation of calculating the shelf score of the shelf according to the predicted sales volume of items on the shelf, the total inventory of the warehouse, and the number of items on the shelf can be implemented using a specific formula of: shelf score=Σ (predicted sales volume of items/total inventory*the number of items on the shelf).

Operation 1904: determining the shelf popularity levels corresponding to at least some shelves in the warehouse according to the shelf scores of the shelves.

Here, the lower the shelf score, the higher the shelf popularity level corresponding to the shelf.

In an embodiment of the present invention, at least some or all of the shelves in the warehouse are sorted according to the shelf scores corresponding to the shelves in descending order, and the corresponding shelf popularity level is set for each shelf in turn according to the sorting result of the shelves, wherein the higher the shelf score of the shelf, the higher the shelf popularity level corresponding to the shelf, and the lower the shelf score of the shelf, the lower the shelf popularity level corresponding to the shelf.

In an embodiment of the present invention, the shelf popularity level corresponding to the shelf and the location popularity level corresponding to the shelf are obtained through different conditions. For example, the shelf popularity level is determined according to the shelf score, and the location popularity level is determined according to the average value of optimal paths from the location of the shelf to the work station, so the shelf popularity level corresponding to the shelf and the location popularity level corresponding to the shelf can be understood as the popularity levels that have been normalized. The shelf popularity level and the location popularity level are in the same standard unit, which can be convenient to compare the shelf popularity level and location popularity level. Exemplarily, it is assumed that there are 5 shelves of which the shelf scores are 99, 55, 66, 180, 20 in sequence, the shelves are divided into 5 popularity zones according to the locations of the shelves, and the popularity levels corresponding to the shelves are level 1, level 2, level 3, level 4, level 5 in descending order, then the units of the shelf popularity levels corresponding to the shelves determined according to the shelf scores should also be unified to the above 5 popularity levels, for example, the shelf popularity levels of the above shelves obtained according to the shelf scores are level 3, level 4, level 4, level 1 and level 5 respectively, wherein the reason why the shelf popularity levels of the above shelves have two level 4 is: there are two shelves with shelf scores of 55 and 66, and the shelf scores of these two shelves are relatively close, so they can be placed at the same level. It should be noted that operation 401 and operation 402 in the embodiment of the present invention can be performed in parallel.

Operation 1905: saving the shelf popularity levels and location popularity levels corresponding to at least some shelves in the warehouse in a shelf information table.

In an embodiment of the present invention, after obtaining the shelf popularity levels and location popularity levels corresponding to at least some or all of the shelves in the warehouse, the obtained shelf popularity level corresponding to each shelf and the obtained location popularity level corresponding to each shelf can be matched with the identifier of each shelf one by one, and the matching relationship among the shelf popularity level corresponding to each shelf, the location popularity level corresponding to each shelf, and the identifier of each shelf is stored in the shelf information table, where the shelf identifier is used to identify which shelf is.

In addition, the shelf popularity levels and location popularity levels stored in the shelf information table are not fixed, because the popularity level of each shelf will change with the items on the shelf, the corresponding shelf score of each shelf will also change, and the shelf popularity level determined by the shelf score will also change. It should be noted that the location popularity level corresponding to the shelf will not change as long as the location of the shelf does not change. In an embodiment, the shelf position adjustment device can update the shelf popularity levels and the location popularity levels in the shelf information table periodically.

Operation 1906: when the location adjustment condition is generated, querying whether there is at least one candidate shelf in the shelf information table if the shelf popularity level of the current shelf is greater than the location popularity level corresponding to the current shelf.

Here, the shelf popularity level corresponding to the candidate shelf is less than the location popularity level corresponding to the candidate shelf.

In one embodiment, the location adjustment condition triggering whether to subsequently judge the shelf popularity level and location popularity level may include: before a shelf needs to be returned from a location of any work station in the warehouse to a location of the shelf, or when a shelf is idle.

Operation 1907: when at least one candidate shelf in the shelf information table is found, determining a target shelf that exchanges locations with the current shelf in the at least one candidate shelf.

In an embodiment, the operation of determining a target shelf that exchanges locations with the current shelf in the at least one candidate shelf may include:

judging whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf; and when there is at least one target shelf in at least one candidate shelf, determining a target shelf that exchanges locations with the current shelf in the at least one target shelf.

Operation 1908: controlling the robot to transport the current shelf to the location where the target shelf is located and transport the target shelf to the location where the current shelf is located.

In the technical solution of the embodiment of the present invention, the shelf popularity levels and location popularity levels corresponding to at least some shelves in the warehouse are determined according to the preset period and saved in a shelf information table; when the location adjustment condition is generated, it is queried whether there is at least one candidate shelf in the shelf information table if the shelf popularity level of the current shelf is greater than the location popularity level corresponding to the current shelf; wherein the shelf popularity level corresponding to the candidate shelf is less than the location popularity level corresponding to the candidate shelf; the target shelf that exchanges locations with the current shelf is determined in the at least one candidate shelf when at least one candidate shelf is queried in the shelf information table; and the robot is controlled to transport the current shelf to the location where the target shelf is located and transport the target shelf to the location where the current shelf is located. The technical solution of the embodiment of the present invention can update the shelf popularity level and location popularity level of each shelf in the warehouse in real time, and determine whether to adjust the shelf location according to the updated shelf popularity level and location popularity level. It solves the problems of long transport distance, long transport time and low picking efficiency of the current shelf in the process of transporting the current shelf to the work station by the robot, reduces the movement distance of the robot, reduces the number of times of shelf transports, shortens the transport time, and improves the picking efficiency.

Figure 21:
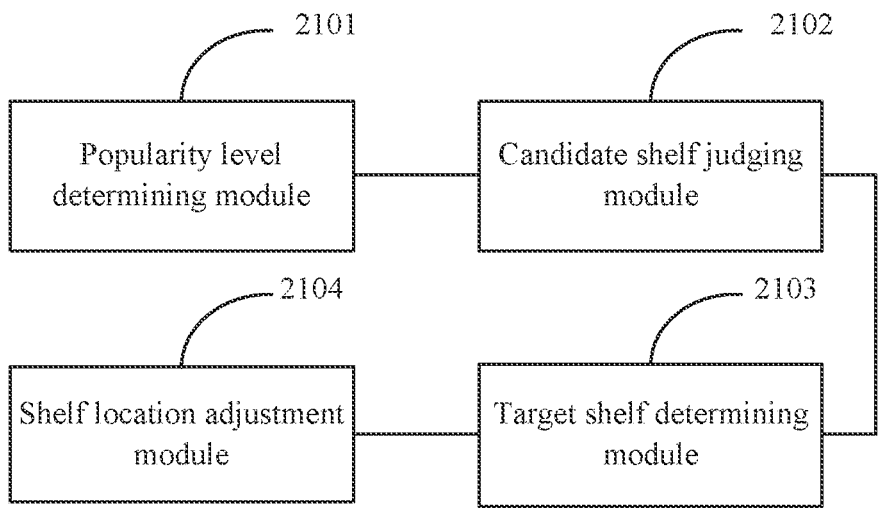
FIG. 21 is a schematic flowchart of an apparatus for adjusting the shelf position provided in an embodiment of the present invention.

FIG. 21 is a structural schematic diagram of a shelf position adjustment device provided in an embodiment of the present invention. The device performs the shelf position adjustment method provided in any of the foregoing embodiments, and the device can be implemented in software and/or hardware. The device can be integrated in any computer equipment of a shelf position adjustment system with the network communication function, and the computer equipment can be a server for completing the shelf position adjustment or a computer equipment such as computer.

As shown in FIG. 21, the shelf location adjustment device in the embodiment of the present invention may include: a popularity level determining module 2101, a candidate shelf judging module 2102, a target shelf determining module 2103, and a shelf location adjustment module 2104.

The popularity level determining module 2101 is configured to: determine shelf popularity levels and location popularity levels corresponding to at least some shelves in a warehouse according to a preset period, and save them in a shelf information table.

The candidate shelf judging module 2102 is configured to: when a location adjustment condition is generated, query whether there is at least one candidate shelf in the shelf information table if the shelf popularity level of the current shelf is greater than the location popularity level corresponding to the current shelf; wherein the shelf popularity level corresponding to the candidate shelf is less than the location popularity level corresponding to the candidate shelf.

The target shelf determining module 2103 is configured to: when at least one candidate shelf in the shelf information table is found, determine a target shelf that exchanges locations with the current shelf in the at least one candidate shelf.

The shelf location adjustment module 2104 is configured to: control the robot to transport the current shelf to the location where the target shelf is located and transport the target shelf to the location where the current shelf is located.

In an embodiment, the target shelf determining module 2103 may include: a target shelf judging unit and a target shelf determining unit.

The target shelf judging unit is configured to: judge whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf;

The target shelf determining unit is configured to: when there is at least one target shelf in the at least one candidate shelf, determine a target shelf that exchanges locations with the current shelf in the at least one target shelf.

In an embodiment, the location adjustment condition may include: before a shelf needs to be returned from a location of any work station in the warehouse to a location of the shelf, or when a shelf is idle.

In an embodiment, the popularity level determining module 2101 may include: an optimal path calculation unit and a location popularity determining unit.

The optimal path calculation unit is configured to: for any one of at least some shelves in the warehouse, calculate an average value of optimal paths from the location of the shelf to each work station according to the location of the shelf and the location of each work station in the warehouse;

The location popularity determining unit is configured to: determine the location popularity levels corresponding to at least some shelves in the warehouse according to the average value of optimal paths from the location of the shelf to each work station; wherein the smaller the average value of optimal paths, the greater the location popularity level corresponding to the shelf.

In an embodiment, the popularity level determining module 2101 may further include: a shelf score calculation unit and a shelf popularity determining module.

The shelf score calculation unit is configured to: for any one of at least some shelves in the warehouse, calculate a shelf score of the shelf according to a sales impact factor corresponding to the shelf.

The shelf popularity determining module is configured to: determine the shelf popularity levels corresponding to at least some shelves in the warehouse according to the shelf score of the shelf, wherein the smaller the shelf score, the greater the shelf popularity level corresponding to the shelf.

In an embodiment, the shelf score calculation unit may include: a predicted sales volume calculation subunit and a shelf score calculation subunit.

The predicted sales volume calculation subunit is configured to: calculate predicted sales volume of items on the shelf according to sales volume impact factors corresponding to the items on the shelf and weights corresponding to the sales volume impact factors; wherein the sales volume impact factors include at least one of: order pool factor, historical sales volume factor, historical stacking factor, inventory factor and designated sales volume factor;

The shelf score calculation subunit is configured to: calculate the shelf score of the shelf according to the predicted sales volume of items on the shelf, the total inventory of the warehouse, and the number of items on the shelf.

The shelf location adjustment device provided in the embodiment of the present application can perform the shelf location adjustment method provided in any embodiment of the present application, and has the corresponding functional modules performing the shelf location adjustment method and beneficial effects thereof.

Figure 22:
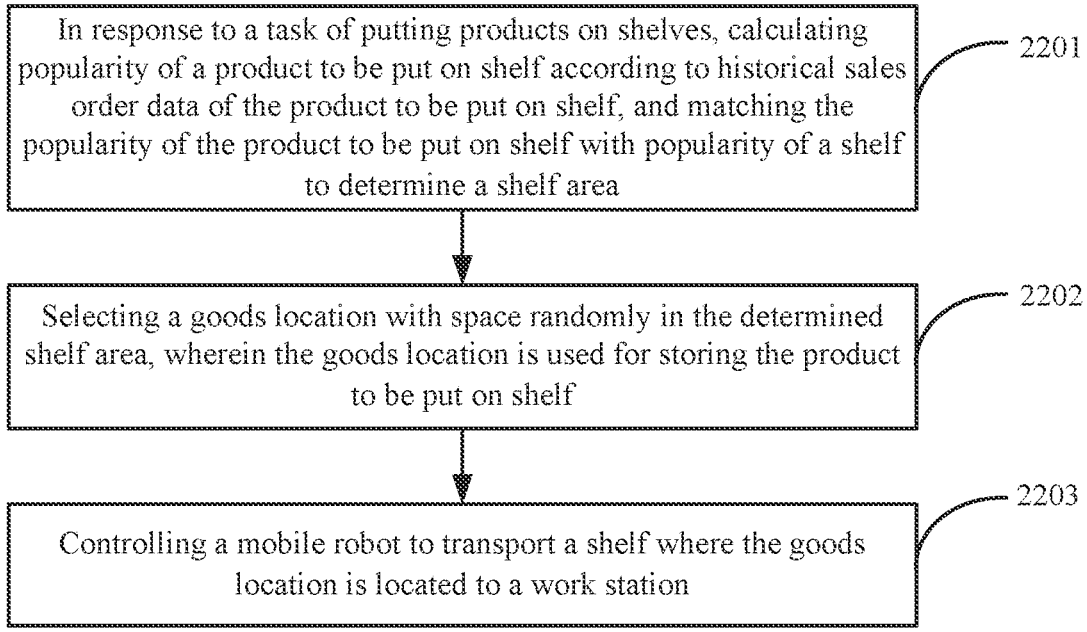
FIG. 22 is a flowchart of a management method applied to the goods-to-person system provided in an embodiment of the present invention.

As shown in FIG. 22, an embodiment of the present invention provides a management method applied to a goods-to-person system, including: operation 2201, operation 2202, and operation 2203.

Operation 2201: in response to a task of putting items on shelves, calculating popularity of an item to be put on shelf according to historical sales order data of the item to be put on shelf, and matching the popularity of the item to be put on shelf with popularity of a shelf to determine a shelf area with popularity corresponding to the popularity of the item to be put on the shelf.

Operation 2202: selecting a goods location with space randomly in the determined shelf area, wherein the goods location is used for storing the item to be put on shelf.

Operation 2203: controlling a mobile robot to transport a shelf where the goods location is located to a work station.

Figure 23:
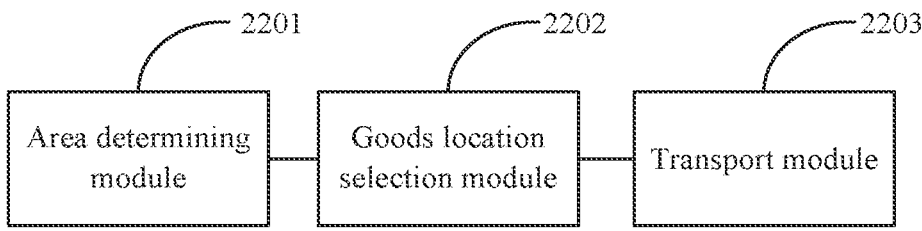
FIG. 23 is a schematic diagram of a management apparatus applied to the goods-to-person system provided in an embodiment of the present invention.

As shown in FIG. 23, an embodiment of the present invention provides a management device applied to a goods-to-person system, including: an area determining module 2301, a goods location selection module 2302, and a transport module 2303.

The area determining module 2301 is configured to: in response to a task of putting items on shelves, calculate popularity of an item to be put on shelf according to historical sales order data of the item to be put on shelf, and match the popularity of the item to be put on shelf with popularity of a shelf to determine a shelf area.

The goods location selection module 2302 is configured to: select a goods location with space randomly in the determined shelf area, wherein the goods location is used for storing the item to be put on shelf.

The transport module 2303 is configured to: control a mobile robot to transport a shelf where the goods location is located to a work station.

In an embodiment, the device further includes: a shelf partition module.

The shelf partition module is configured to: partition shelves according to work locations to obtain a plurality of work location partitions, wherein each work location belongs to one work location partition, and a shelf is divided into a work location partition closest to the shelf. It should be understood that such partition is a logical partition.

In an embodiment, the shelf partition module is further configured to: store a kind of stock items dispersedly on a plurality of shelves in different work location partitions.

In an embodiment, the number of stored pieces of a kind of stock items on one of the plurality of shelves is less than or equal to a preset storage minimum value, and the storage minimum value is k=max(m1, m2, n/2*w), wherein w is the number of sorting work locations in the work station, n is the total storage number of stock items, m1 is the maximum number of stock items in item order lines of an order structure, and m2 is the daily sales volume of stock items.

In an embodiment, the device further includes: a shelf adjustment unit.

The shelf adjustment unit is configured to adjust positions of shelves in the shelf area in case of meeting a shelf adjustment condition.

In an embodiment, the device further includes: a task generating unit.

The task generating unit is configured to: generate an order task according to orders to be processed in response to an order processing task, assign the order task to the work station, select a shelf for the order task and assign a mobile robot.

What is claimed is:

1. A management method applied to a goods-to-person system, wherein the goods-to-person system comprises a plurality of shelves each comprising a plurality of goods locations, wherein the plurality of goods locations in each shelf is capable of storing different types of items, wherein the method comprises:

in response to a shelving task, calculating a popularity level of an item to be shelved according to historical sales order data of the item to be shelved, and matching the popularity level of the item to be shelved with a shelf popularity level to determine, shelves each with a shelf popularity level corresponding to the popularity level of the item to be shelved, wherein the shelves each with the shelf popularity level corresponding to the popularity level of the item to be shelved form a shelf area;

selecting randomly a goods location with space among the shelves in the shelf area, wherein the goods location is used for storing the item to be shelved;

controlling a mobile robot to transport a shelf with the selected goods location with space to a work station to allow an operator to put the item to be shelved on the goods location in the shelf with the selected goods location with space;

wherein the method further comprises:

partitioning the shelves in the shelf area, according to work locations in the goods-to-person system, into a plurality of logical partitions, wherein each work location belongs to one logical partition;

allocating each shelf in the shelf area into a logical partition closest to the each shelf; wherein inventory items of one type are dispersedly stored on a plurality of shelves in different logical partitions.

2. The method according to claim 1, wherein a quantity of inventory items of one type stored on one of the plurality of shelves is less than or equal to a preset minimum storage value, and the minimum storage value is k=max(m1, m2, n/2*w), wherein w is a quantity of sorting work locations in the work station, n is a total storage number of inventory items, m1 is a maximum number of inventory items in item order lines of an order structure, and m2 is a daily sales volume of inventory items.

3. The method according to claim 1, wherein said selecting randomly a goods location with space in the shelves in the shelf area, comprises:

weighting a volume matching factor and a weight matching factor of the item to be shelved to obtain a matching degree, sorting the goods locations based on matching degree, and selecting the goods location with space based on a priority of selecting a goods location with higher matching degree being greater than a priority of selecting a goods location with lower matching degree; wherein the volume matching factor is determined by calculating a quantity of items to be shelved that is allowed to be placed on each shelf according to lengths, widths and heights of the items to be shelved, and the weight matching factor is determined by calculating a floor height of a shelf where items to be shelved should be placed according to a density of the items to be shelved.

4. The method according to claim 1, further comprising: adjusting positions of shelves in the shelf area in response to meeting a shelf adjustment condition.

5. The method according to claim 4, wherein said adjusting positions of shelves in the shelf area in response to meeting a shelf adjustment condition, comprises:
  determining shelf popularity levels and location popularity levels corresponding to at least some shelves in a warehouse according to a preset period, and saving them in a shelf information table;
  in response to meeting the shelf adjustment condition, querying whether there is at least one candidate shelf in the shelf information table when a shelf popularity level of a current shelf is greater than a location popularity level corresponding to the current shelf; wherein a shelf popularity level corresponding to the candidate shelf is less than a location popularity level corresponding to the candidate shelf;
  in response to at least one candidate shelf in the shelf information table being found, determining a target shelf which will exchange locations with the current shelf in the at least one candidate shelf;
  controlling the robot to transport the current shelf to a location where the target shelf is located and then transport the target shelf to a location where the current shelf is located.

6. The method according to claim 5, wherein said determining a target shelf which will exchange locations with the current shelf in the at least one candidate shelf, comprises:
  judging whether there is at least one target shelf in the at least one candidate shelf; wherein the location popularity level corresponding to the target shelf is greater than the location popularity level corresponding to the current shelf, and the shelf popularity level corresponding to the target shelf is less than the shelf popularity level corresponding to the current shelf;
  when there is at least one target shelf in the at least one candidate shelf, determining a target shelf which will exchange locations with the current shelf in the at least one target shelf.

7. The method according to claim 5, wherein the shelf adjustment condition comprises: before a shelf needs to be returned from a location of any work station in the warehouse to a location of the shelf, or when a shelf is idle.

8. The method according to claim 5, wherein determining location popularity levels corresponding to at least some shelves in a warehouse according to a preset period, comprises:
  for any one of at least some shelves in the warehouse, calculating an average value of optimal paths from the location of the shelf to each work station according to the location of the shelf and the location of each work station in the warehouse;
  determining the location popularity levels corresponding to at least some shelves in the warehouse according to the average value of optimal paths from the location of the shelf to each work station; wherein the smaller the average value of optimal paths, the greater the location popularity level corresponding to the shelf.

9. The method according to claim 5, wherein said determining shelf popularity levels corresponding to at least some shelves in a warehouse according to a preset period, comprises:
  for any one of at least some shelves in the warehouse, calculating a shelf score of the shelf according to a sales impact factor corresponding to the shelf;
  determining the shelf popularity levels corresponding to at least some shelves in the warehouse according to the shelf score of the shelf, wherein the smaller the shelf score, the greater the shelf popularity level corresponding to the shelf.

10. The method according to claim 9, wherein said that calculating a shelf score of the shelf according to a sales impact factor corresponding to the shelf, comprises:
  calculating predicted sales volume of items on the shelf according to sales volume impact factors corresponding to the items on the shelf and weights corresponding to the sales volume impact factors; wherein the sales volume impact factors comprise at least one of: order pool factor, historical sales volume factor, historical shelving factor, inventory factor and designated sales volume factor;
  calculating the shelf score of the shelf according to the predicted sales volume of items on the shelf, a total inventory of the warehouse, and a quantity of items on the shelf.

11. The method according to claim 1, further comprising:
  generating an order task according to orders to be processed in response to an order processing task, assigning the order task to a work station, selecting a shelf for the order task and assigning a mobile robot.

12. The method according to claim 11, wherein said assigning a mobile robot for the order task, comprises:
  determining a first calculation distance from a nearest idle mobile robot to a shelf to be transported;
  determining a second calculation distance from a mobile robot that is currently used to transport a shelf to be returned to the shelf to be transported;
  selecting a mobile robot with a closest distance based on the first calculation distance and the second calculation distance;
  wherein the second calculation distance is:
  a sum of a remaining path length of the mobile robot used to transport the shelf to be returned and a distance from a return point of the shelf to be returned to the shelf to be transported plus an equivalent distance length the mobile robot walks during a time period to place the shelve to be returned.

13. The method according to claim 11, further comprising:
  when a shelf in the transport task is required by multiple work stations, selecting a path of the shelf in the transport task according to a minimum waiting time;
  wherein selecting a path of the shelf in the transport task according to the minimum waiting time, comprises:
  determining time consumption of moving the shelf in the transport task to each work station;
  scheduling the shelf in the transport task for the multiple work stations in an order of time consumption from small to large;
  wherein the time consumption is a sum of distance transportation time, queue waiting time and shelf rotation time.

14. The method according to claim 11, wherein a priority of generating transport tasks for high-priority orders is greater than a priority of generating transport tasks for low-priority orders.

15. The method according to claim 11, wherein generating an order task according to orders to be processed, comprises:
grouping the orders to be processed to form wave orders, and generating wave order tasks according to the wave orders.

16. The method according to claim 15, wherein said that grouping the orders to be processed, comprises:
establishing an association relationship among the orders to be processed according to inventory;
performing a clustering combination according to the association relationship among the orders to be processed.

17. The method according to claim 15, wherein said assigning the order task to the work station, comprises:
allocating the order task to the work station at least partially according to a distance optimum principle when grouping the orders to be processed.

18. The method according to claim 17, further comprising:
performing load administration on tasks of adjacent work stations according to a balance of task load of work stations.

19. The method according to claim 11, wherein said that selecting a shelf for the order task comprises:
selecting a shelf where an order item is located in a shelf pool of the current work station according to information of order items in the order task;
when the shelf selected in the shelf pool of the current work station cannot satisfy all order items in the order task, continuing to select a shelf where order items with no selected shelf in the order task are located in shelves except the shelf pool of the current work station according to information of the order items with no selected shelf in the order task.

20. The method according to claim 19, wherein said continuing to select a shelf where order items with no selected shelf are located in shelves except the shelf pool of the current work station according to information of the order items with no selected shelf in the order task, comprises:
determining information of the shelf where the order items with no selected shelf are located in shelves except the shelf pool of the current work station according to the information of the order items with no selected shelf in the order task;
selecting a shelf where a type number of order items with no selected shelf comprised exceeds a currently-set second threshold as a second target shelf in each shelf selecting process according to the information of the shelf where order items with no selected shelf are located; or sorting shelves based on the type number of order items with no selected shelf comprised on each shelf and selecting a second target shelf in terms of a sorting result in each shelf selecting process according to the information of the shelf where order items with no selected shelf are located.

21. The method according to claim 20, wherein said selecting a shelf where the type number of order items with no selected shelf comprised exceeds a currently-set second threshold as a second target shelf in each shelf selecting process according to the information of the shelf where order items with no selected shelf are located, comprises:
when a quantity of shelves where a type number of order items with no selected shelf comprised exceeds the currently-set second threshold is greater than or equal to 2 in each shelf selecting process according to the information of the shelf where order items with no selected shelf are located, selecting a shelf of which a distance from the current work station does not exceed a distance threshold as the second target shelf.

22. The method according to claim 19, wherein said that selecting a shelf where an order item is located in a shelf pool of the current work station according to information of the order item in the order task, comprises:
determining that the shelf pool of the current work station comprises information of the shelf of the order items in the order task according to the information of the order items in the order task;
selecting a shelf where a type number of order items comprised exceeds a currently-set first threshold as a first target shelf in each shelf selecting process according to the determined shelf information; or sorting shelves based on the type number of order items comprised on each shelf and selecting a first target shelf in terms of a sorting result in each shelf selecting process according to the determined shelf information.

23. The method according to claim 22, wherein said that selecting a shelf where the type number of order items comprised exceeds a currently-set first threshold as a first target shelf in each shelf selecting process according to the determined shelf information, comprises:
when a quantity of shelves where a type number of order items comprised exceeds the currently-set first threshold is greater than or equal to 2 in each shelf selecting process according to the determined shelf information, selecting a shelf which first entered the shelf pool of the current work station as the first target shelf according to a sequential order in which the shelves entered the shelf pool.

24. The method according to claim 19, further comprising:
when the shelf selected in the shelf pool of the current work station cannot satisfy all order items in the order task, selecting shelves where order items with no selected shelf are located successively in unselected shelves and shelf pools of other work stations except the current work station according to the information of the order items with no selected shelf in the order task, wherein the unselected shelves comprise shelves except shelf pools of all work stations in the warehouse.

25. The method according to claim 24, wherein said selecting a shelf where order items with no selected shelf are located successively in unselected shelves and shelf pools of other work stations except the current work station according to the information of the order items with no selected shelf in the order task, comprises:
selecting a shelf where the type number of order items with no selected shelf comprised exceeds a currently-set third threshold in the unselected shelves as a third target shelf in each shelf selecting process according to the information of the order items with no selected shelf in the order task; or sorting shelves in the unselected shelves based on the type number of order items with no selected shelf comprised on each shelf and selecting a third target shelf in terms of the sorting result in each shelf selecting process according to the information of the order items with no selected shelf in the order task;

when there are still remaining order items with no selected shelf in the order task after selecting the third target shelf, continuing to select a fourth target shelf in shelf pools of work stations except the current work station, wherein the fourth target shelf is a shelf where a type number of remaining order items with no selected shelf comprised exceeds a currently-set fourth threshold in each shelf selecting process, or a shelf determined based on shelf sorting in each shelf selecting process.

26. A management system applied to a goods-to-person system, comprising:
a plurality of shelves each comprising a plurality of goods locations, wherein the plurality of goods locations in each shelf is capable of storing different types of items, and the plurality of shelves each can be transported by a mobile robot;
the mobile robot configured to transport shelves;
a shelf area configured to place the shelves;
a server configured to run:
in response to a shelving task, calculating a popularity level of an item to be shelved according to historical sales order data of the item to be shelved, and matching the popularity level of the item to be shelved with a shelf popularity level to determine, shelves each with a shelf popularity level corresponding to the popularity level of the item to be shelved, wherein the shelves each with the shelf popularity level corresponding to the popularity level of the item to be shelved form a shelf area;
selecting randomly a goods location with space among the shelves in the shelf area, wherein the goods location is used for storing the item to be shelved;
controlling a mobile robot to transport a shelf with the selected goods location with space to a work station to allow an operator to put the item to be shelved on the goods location in the shelf with the selected goods location with space;
wherein the server is further configured to run:
partitioning the shelves in the shelf area, according to work locations in the goods-to-person system, into a plurality of logical partitions, wherein each work location belongs to one logical partition;
allocating each shelf in the shelf area into a logical partition closest to the each shelf; wherein inventory items of one type are dispersedly stored on a plurality of shelves in different logical partitions.

27. The system according to claim 26, wherein the mobile robot is a wheel-driven trolley with a jacking mechanism and with action abilities to walk in a straight line, walk in an arc and spot turn.

28. The system according to claim 27, wherein:
the jacking mechanism and a body of the trolley move independently, comprising at least one of: that the body of the trolley does not move while the jacking mechanism descends and lifts; that the jacking mechanism rotates while the body of the trolley does not move; that the body of the trolley and the jacking mechanism rotate at a same speed in a case that the body of the trolley and the jacking mechanism are locked; that the body of the trolley and the jacking mechanism rotate at different speeds at the same time.

29. A server, applied to a goods-to-person system, wherein the goods-to-person system comprises a plurality of shelves each comprising a plurality of goods locations, wherein the plurality of goods locations in each shelf is capable of storing different types of items, wherein the server comprises:
at least one processor;
a storage device configured to store at least one program, when the at least one program is executed by the at least one processor, the at least one processor realizes a management method comprising:
in response to a shelving task, calculating a popularity level of an item to be shelved according to historical sales order data of the item to be shelved, and matching the popularity level of the item to be shelved with a shelf popularity level to determine, shelves each with a shelf popularity level corresponding to the popularity level of the item to be shelved, wherein the shelves each with the shelf popularity level corresponding to the popularity level of the item to be shelved form a shelf area;
selecting randomly a goods location with space among the shelves in the shelf area, wherein the goods location is used for storing the item to be shelved;
controlling a mobile robot to transport a shelf with the selected goods location with space to a work station to allow an operator to put the item to be shelved on the goods location in the shelf with the selected goods location with space;
wherein the at least one processor further realizes:
partitioning the shelves in the shelf area, according to work locations in the goods-to-person system, into a plurality of logical partitions, wherein each work location belongs to one logical partition;
allocating each shelf in the shelf area into a logical partition closest to the each shelf; wherein inventory items of one type are dispersedly stored on a plurality of shelves in different logical partitions.

30. A computer-readable storage medium storing a computer program thereon, applied to a goods-to-person system, wherein the goods-to-person system comprises a plurality of shelves each comprising a plurality of goods locations, wherein the plurality of goods locations in each shelf is capable of storing different types of items, wherein the computer program, when executed by a processor, realizes a management method comprising:
in response to a shelving task, calculating a popularity level of an item to be shelved according to historical sales order data of the item to be shelved, and matching the popularity level of the item to be shelved with a shelf popularity level to determine, shelves each with a shelf popularity level corresponding to the popularity level of the item to be shelved, wherein the shelves each with the shelf popularity level corresponding to the popularity level of the item to be shelved form a shelf area;
selecting randomly a goods location with space among the shelves in the shelf area, wherein the goods location is used for storing the item to be shelved;
controlling a mobile robot to transport a shelf with the selected goods location with space to a work station to allow an operator to put the item to be shelved on the goods location in the shelf with the selected goods location with space;
wherein the computer program, when executed by a processor, further realizes:
partitioning the shelves in the shelf area, according to work locations in the goods-to-person system, into a plurality of logical partitions, wherein each work location belongs to one logical partition;

allocating each shelf in the shelf area into a logical partition closest to the each shelf wherein inventory items of one type are dispersedly stored on a plurality of shelves in different logical partitions.

\* \* \* \* \*